United States Patent
Lei et al.

(10) Patent No.: US 12,396,036 B2
(45) Date of Patent: Aug. 19, 2025

(54) PDCCH ORDERED RANDOM ACCESS CHANNEL PROCEDURE FOR REDUCED CAPABILITY USER EQUIPMENT

(71) Applicant: QUALCOMM Incorporated, San Diego, CA (US)

(72) Inventors: Jing Lei, San Diego, CA (US); Muhammad Nazmul Islam, Littleton, MA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/809,247

(22) Filed: Jun. 27, 2022

(65) Prior Publication Data

US 2023/0044766 A1 Feb. 9, 2023

Related U.S. Application Data

(60) Provisional application No. 63/229,764, filed on Aug. 5, 2021.

(51) Int. Cl.
*H04W 74/0833* (2024.01)
*H04L 5/16* (2006.01)
*H04W 72/51* (2023.01)

(52) U.S. Cl.
CPC .......... *H04W 74/0833* (2013.01); *H04L 5/16* (2013.01); *H04W 72/51* (2023.01)

(58) Field of Classification Search
CPC ............. H04W 74/0833; H04W 72/51; H04W 72/0453; H04W 74/006; H04L 5/16; H04L 5/0012; H04L 5/0053
See application file for complete search history.

(56) References Cited

U.S. PATENT DOCUMENTS 10,721,340 B2 7/2020 Blankenship et al.
10,959,268 B2 3/2021 Islam et al.
(Continued)

OTHER PUBLICATIONS

International Search Report and Written Opinion—PCT/US2022/073875—ISA/EPO—Oct. 13, 2022.
(Continued)

*Primary Examiner* — Yu-Wen Chang
(74) *Attorney, Agent, or Firm* — Patterson + Sheridan, L.L.P.

(57) ABSTRACT

Certain aspects of the present disclosure provide techniques for a physical downlink control channel (PDCCH) ordered random access channel (RACH) procedure. The RACH procedure may be associated with a cell-defining synchronization signal block (SSB) or non-cell-defining SSB. A method for wireless communications by a user equipment (UE) includes transmitting an indication of one or more capabilities of the UE, receiving a PDCCH that orders the UE to perform a RACH procedure on an uplink carrier based on the one or more capabilities of the UE, determining a minimum gap between a last symbol of the PDCCH and a first symbol of a RACH message, wherein the minimum gap includes a half-duplex (HD) switching delay, and performing the RACH procedure on the uplink carrier when a gap between the last symbol of the PDCCH and the first symbol of the RACH message is equal to or larger than the minimum gap.

30 Claims, 13 Drawing Sheets

(56) References Cited

U.S. PATENT DOCUMENTS

| | | | |
|---|---|---|---|
| 2020/0267773 A1 | 8/2020 | Islam et al. | |
| 2021/0051672 A1* | 2/2021 | Rastegardoost | H04W 74/006 |
| 2021/0297967 A1* | 9/2021 | Tanaka | H04W 56/0015 |
| 2022/0167148 A1* | 5/2022 | Kim | H04L 25/0204 |
| 2023/0044448 A1* | 2/2023 | Lin | H04W 16/14 |
| 2023/0217498 A1* | 7/2023 | Lee | H04W 74/0833 370/329 |
| 2023/0224953 A1* | 7/2023 | Xiong | H04L 5/0044 370/329 |
| 2023/0224972 A1* | 7/2023 | Cheng | H04W 74/0833 370/329 |
| 2023/0397247 A1* | 12/2023 | Jung | H04L 1/1854 |

OTHER PUBLICATIONS

Samsung: "HD-FDD Operation for RedCap UEs", R1-2105318, 3GPP TSG RAN WG1 #105-e, 3rd Generation Partnership Project (3GPP), Mobile Competence Centre, 650, Route Des Lucioles, F-06921 Sophia-Antipolis Cedex, France, vol. RAN WG1, No. e-Meeting, May 19, 2021-May 27, 2021, May 12, 2021, XP052011364, 6 Pages, p. 5.

Sony: "Half-Duplex FDD Operation for Redcap UEs", 3GPP TSG RAN WG1#104bis_e, R1-2103309, 3rd Generation Partnership Project (3GPP), Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 4 Pages, XP052178076, p. 3-p. 4, paragraph [0003].

* cited by examiner

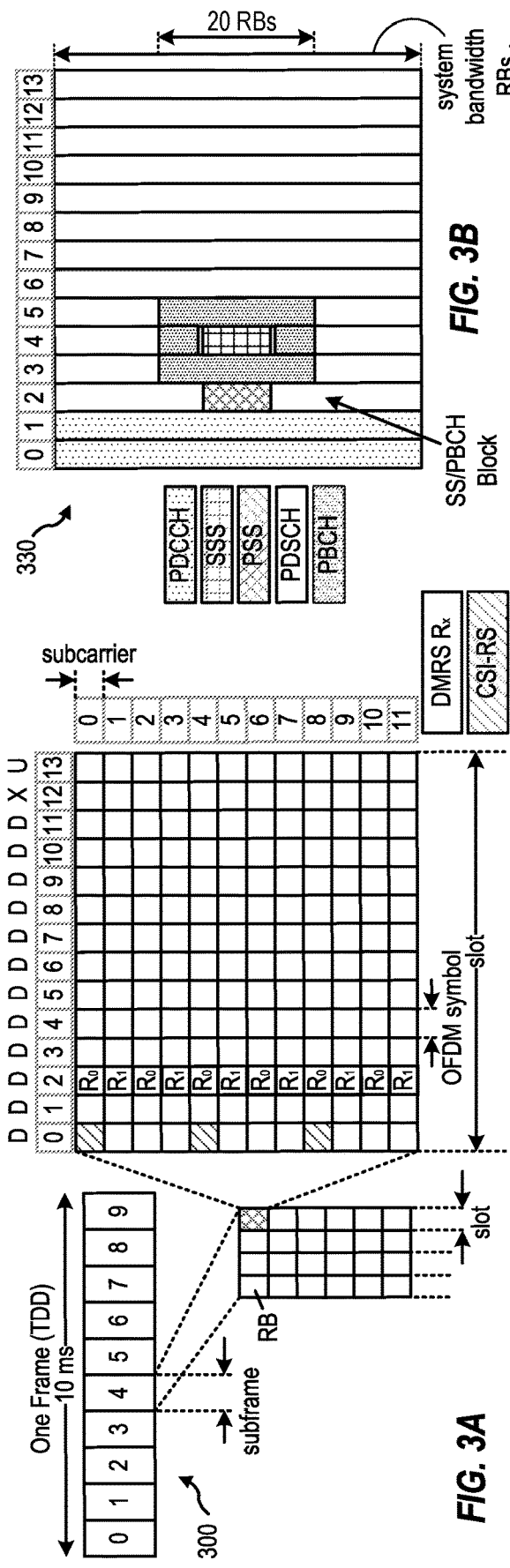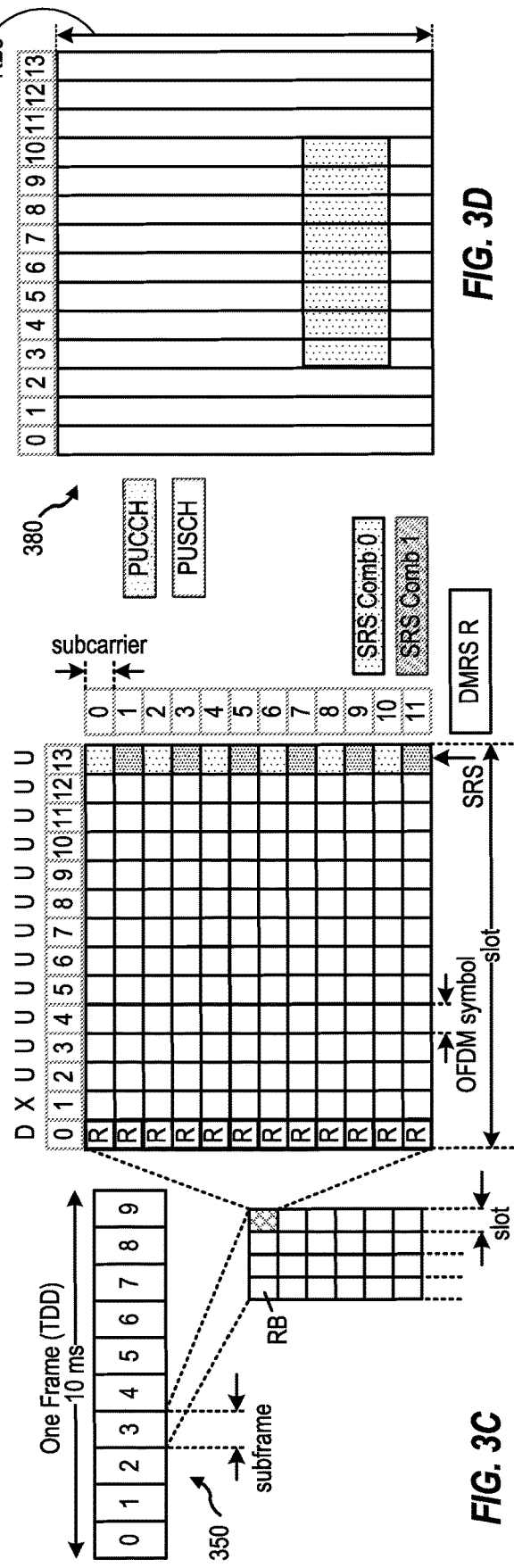

1000

1005

Transmit, to at least one UE, a PDCCH that orders the UE to perform a type of RACH procedure using at least one of a CE or a power control scheme in a manner determined by indicated capabilities of the UE

1010

Participate in the type of RACH procedure with the UE in accordance with the PDCCH and the indicated capabilities of the UE

*FIG. 10*

PDCCH ORDERED RANDOM ACCESS CHANNEL PROCEDURE FOR REDUCED CAPABILITY USER EQUIPMENT

CROSS-REFERENCE TO RELATED APPLICATION(S)

This application claims benefit of and priority to U.S. Provisional Application No. 63/229,764, filed Aug. 5, 2021, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for ordering a reduced capability (RedCap) user equipment (UE) to perform a random access channel (RACH) procedure.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a UE includes transmitting an indication of one or more capabilities of the UE; receiving a physical downlink control channel (PDCCH) that orders the UE to perform a RACH procedure on an uplink carrier based on the one or more capabilities of the UE; determining a minimum gap between a last symbol of the PDCCH and a first symbol of a RACH message, wherein the minimum gap includes a half-duplex (HD) switching delay; and performing the RACH procedure on the uplink carrier when a gap between the last symbol of the PDCCH and the first symbol of the RACH message is equal to or larger than the minimum gap.

In one aspect, a method for wireless communications by a network entity includes outputting for transmission, to at least one UE, a PDCCH that orders the at least one UE to perform a RACH procedure based on one or more capabilities of the at least one UE; and obtaining a RACH message from the at least one UE after a minimum gap between a last symbol of the PDCCH and a first symbol of the RACH message, wherein the minimum gap includes a HD switching delay.

In one aspect, a method for wireless communication by a UE includes transmitting an indication of one or more capabilities of the UE to a network entity; transmitting a report of channel state information to the network entity; receiving a PDCCH that orders the UE to perform a type of RACH procedure on an uplink carrier using at least one of coverage enhancement (CE) or an uplink power control scheme of the type of RACH procedure in a manner determined by the indicated capabilities of the UE; and performing the type of RACH procedure on the uplink carrier using the CE or uplink power control scheme of the type of RACH procedure in accordance with the PDCCH.

In one aspect, a method for wireless communication by a network entity includes transmitting, to at least one UE, a PDCCH that orders the UE to perform a type of RACH procedure using at least one of a CE or a power control scheme in a manner determined by indicated capabilities of the UE; and participating in the type of RACH procedure with the UE in accordance with the PDCCH and the indicated capabilities of the UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 10 shows example operations by a network entity for a PDCCH ordered RACH procedure, according to aspects of the present disclosure.

DETAILED DESCRIPTION

Aspects of the present disclosure provide apparatuses, methods, processing systems, and computer-readable mediums for ordering a RedCap UE to perform a RACH procedure.

A RACH is a channel that may be shared by multiple UEs and may be used by the UEs to access the network for communications. A RACH procedure may be triggered by a number of events. For example, the RACH procedure may triggered by initial access from an idle mode, by connection re-establishment, by downlink or uplink data arrival, by scheduling request (SR) failure, and/or by beam failure recovery (BFR).

In some cases, a RACH procedure may be ordered (triggered/commanded) by the network via a PDCCH prompting a physical RACH (PRACH) transmission from the UE. For such PDCCH ordered PRACH transmissions, a UE may require a minimum gap, between a last symbol of the PDCCH and a first symbol of the PRACH transmission, in order to give the UE sufficient time for the PRACH transmission. Unfortunately, the minimum gap for a full capability (normal "legacy") UE may not provide sufficient preparation time for a reduced capability UE performing 4-step RACH or 2-step RACH. Further, the minimum gap may not provide sufficient preparation time, even for a full capability UE, to support CE in a PDCCH ordered 4-step or 2-step RACH procedure.

Aspects of the present disclosure, however, provide techniques for enhancing a PDCCH ordered 4-step and 2-step RACH procedure to accommodate for reduced capability UEs and/or for RACH with CE. Such enhancements may include extending the minimum gap time, coverage enhancements, power control enhancements, DCI format enhancement, and extending RACH-ordering PDCCH transmissions from unicast to multicast and from 4-step RACH to 2-step RACH.

There are various potential benefits to the enhancements proposed herein. For example, extending the minimum gap may help accommodate reduced UE capabilities (e.g., such as UEs capable of half-duplex communication, with a relaxed timeline, and with an increased latency for reference signal receive power (RSRP) measurement), while the power control and coverage enhancements may help improve link budget and mitigate intra/inter-cell interference. Further, extending PDCCH transmission from unicast to multicast may help reduce signaling overhead.

Introduction to Wireless Communication Networks

Figure 1:
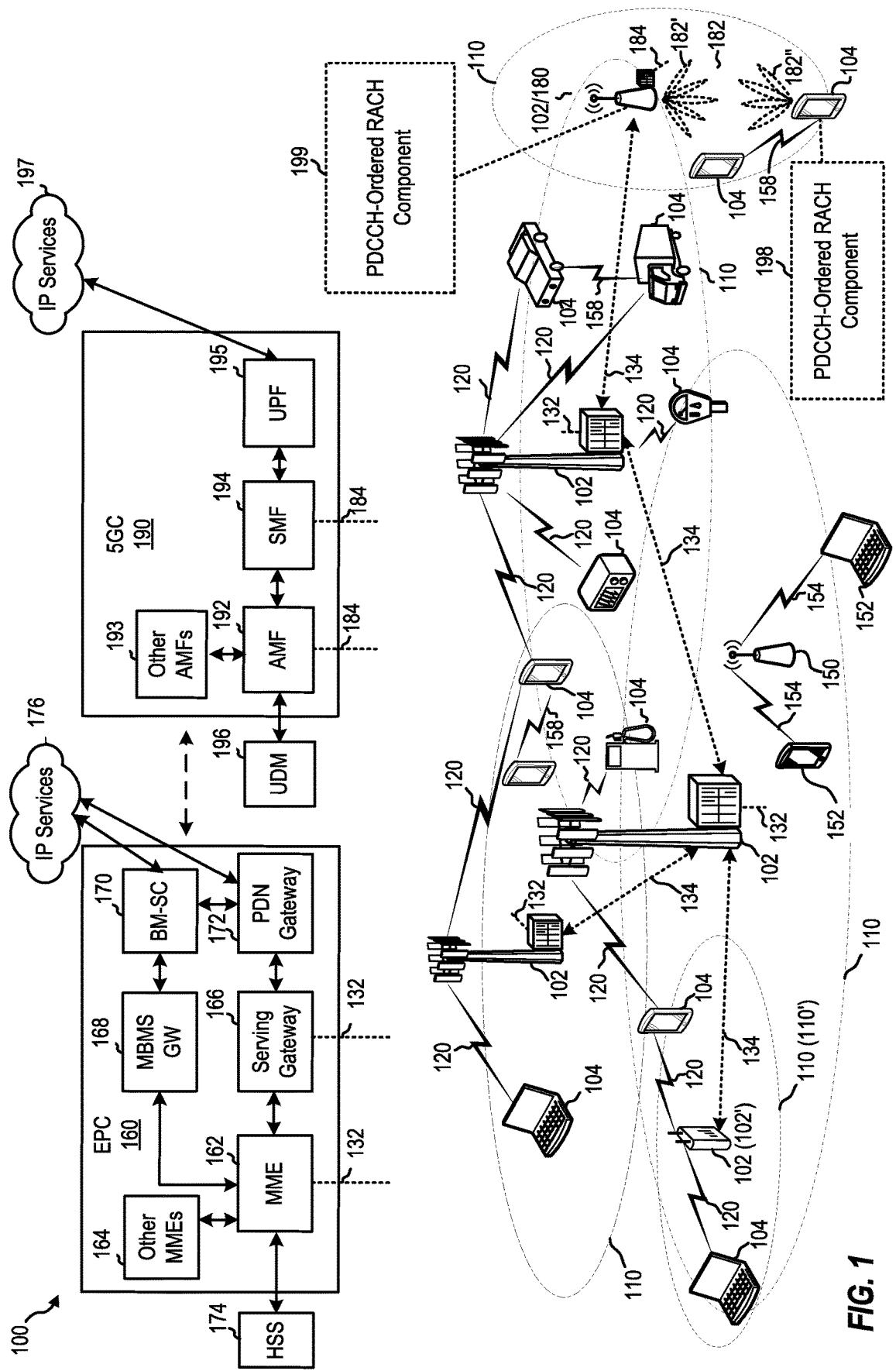
FIG. 1 is a block diagram conceptually illustrating an example wireless communication network.

FIG. 1 depicts an example of a wireless communications system 100, in which aspects described herein may be implemented.

Generally, wireless communications system 100 includes BSs 102, UEs 104, one or more core networks, such as an Evolved Packet Core (EPC) 160 and 5G Core (5GC) network 190, which interoperate to provide wireless communications services.

BSs 102 may provide an access point (AP) to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a next generation nodeB (gNB), NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., BS 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 includes PDCCH-ordered RACH component 199, which may be configured to transmit a PDCCH to order a RACH procedure. Wireless communication network 100 further includes PDCCH-ordered RACH component 198, which may be configured to perform a PDCCH-ordered RACH procedure.

Figure 2:
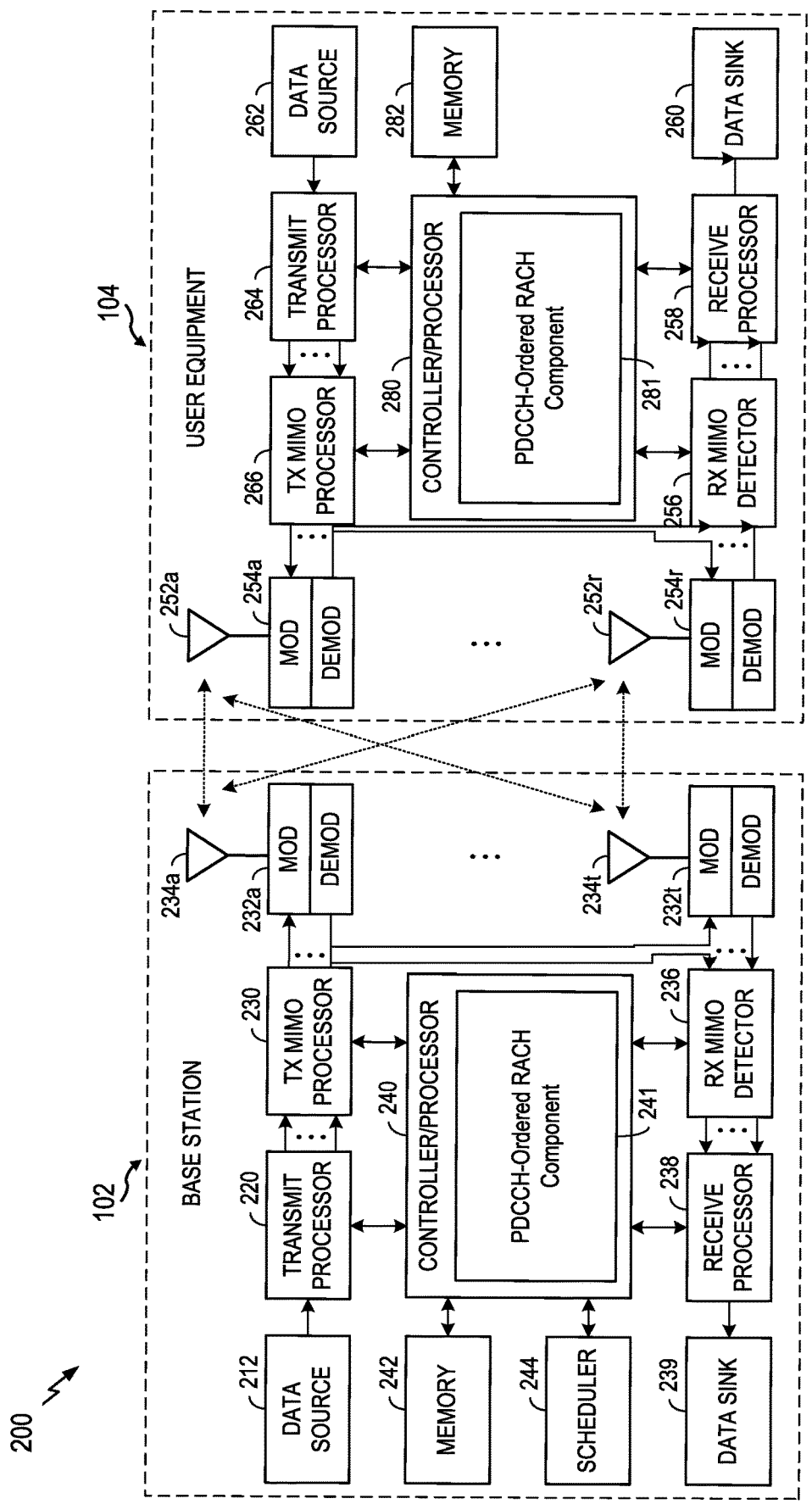
FIG. 2 is a block diagram conceptually illustrating aspects of an example a base station and user equipment.

FIG. 2 depicts aspects of an example BS 102 and an example UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes PDCCH-ordered RACH component 241, which may be representative of PDCCH-ordered RACH component 199 of FIG. 1. Notably, while depicted as an aspect of controller/processor 240, PDCCH-ordered RACH component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes PDCCH-ordered RACH component 281, which may be representative of PDCCH-ordered RACH component 198 of FIG. 1. Notably, while depicted as an aspect of controller/processor 280, PDCCH-ordered RACH component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Figure 4:
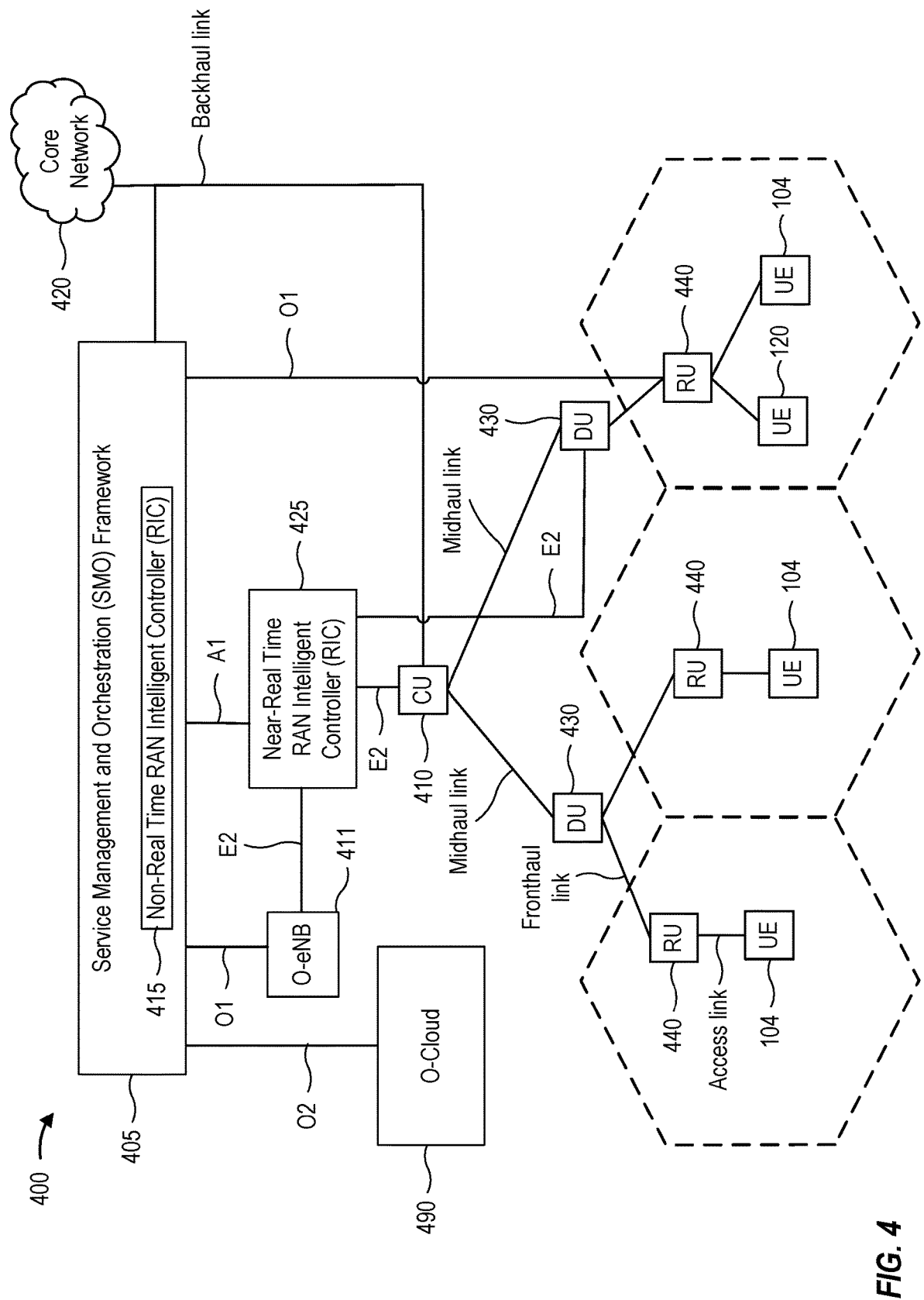
FIG. 4 depicts an example disaggregated base station (BS) architecture.

FIG. 4 depicts an example disaggregated BS.

Further discussions regarding FIG. 1, FIG. 2, FIGS. 3A-3D, and FIG. 4 are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave, or near mmWave, radio frequency band (e.g., 3 GHz-300 GHz) may have higher path loss and a shorter range compared to lower frequency communications. Accordingly, in FIG. 1, mmWave BS 180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Introduction to Reduced Capability (RedCap) Devices

Various technologies may be the focus of current wireless communication standards. For example, Releases 15 (Rel- 15) and/or Rel-16 of the 3GPP technical standard releases may focus on premium smartphones, for example, supporting enhanced mobile broadband (eMBB)), ultra-reliable low-latency communication (URLLC), and/or vehicle-to-everything (V2X) communications. Some wireless communication standards (e.g., 3GPP TS Rel-17 and beyond) focus on efficient and cost effective scalability and deployment for new radio (NR). A new type of UE with reduced capabilities has been introduced. Such UEs with reduced capabilities may be referred to as RedCap UEs. In particular, a RedCap UE may support relaxed peak throughput (e.g., around 20 MHz), latency, and/or reliability requirements. RedCap UEs may have a compact form factor. A RedCap UE may support all NR frequency division duplexing (FDD) bands and time division duplexing (TDD) bands.

Design objectives of NR RedCap UEs may include scalable resource allocation, coverage enhancement for DL and/or UL, power saving in all radio resource control (RRC) states, and co-existence with other UEs. For example, RedCap UEs may coexist with non-RedCap UEs, such as NR premium UEs. As used herein, a premium UE may refer to a non-RedCap UE. An NR premium UE may refer to a legacy non-RedCaP NR UE.

An NR-RedCap UE may be a smart wearable device, a sensor/camera (e.g., smart city devices), or any device configured for relaxed internet-of-things (IoT) communications.

Wearables may include such devices as smart watches, augmented reality (AR) glasses, virtual reality (VR) glasses, electronic health (eHealth) monitoring devices, medical monitoring devices, and the like. Wearables may use data rates of around 5-50 Mbps on the downlink and 2-5 Mbps on the uplink. Wearables may have peak rates of around 150 Mbps on the downlink and 50 Mbps on the uplink. Wearables may have latency and reliability targets similar to those of eMBB devices. Wearables may have a battery life of up to 1-2 weeks.

IoT devices may include connected industry devices, such as pressure sensors, humidity sensors, motion sensors, thermal sensors, accelerometers, actuators, and the like. Connected industry devices may use data rates of around 2 Mbps on the uplink. Connected industry devices may have latency targets less than 100 ms, in general, and around 5-10 ms for safety related sensors. Connected industry devices may have high reliability targets, such as around 99.99%. Connected industry devices may have a battery life of at least a few years.

Smart city devices may include such devices as video surveillance equipment, and the like. Smart city devices may use data rates of around 2-4 Mbps for economy devices and around 7.5-25 Mbps for high-end devices. Smart city devices may have latency targets less than 500 ms, in general. Smart city devices may have high reliability targets, such as around 99%-99.99%.

RedCap UE functionality and/or capability may overlap with those of long term evolution (LTE) and/or fifth generation (5G) devices (e.g., premium 5G devices). For example, RedCap IoT devices and premium 5G devices may both support URLLC. Further, RedCap smart wearables and LTE UEs may both support low power wide area (LPWA) massive machine type communication (mMTC). RedCap sensors/cameras and premium 5G device may both support eMBB.

Example RACH Procedures

A RACH is a wireless channel (medium) that may be shared by multiple UEs and used by the UEs to (randomly) access the network for communications. For example, the RACH may be used for call setup and to access the network for data transmissions. In some cases, the RACH may be used by a UE for initial access to a network when the UE switches from a RRC connected idle mode to active mode. In some cases, the RACH may be used by a UE for initial access to a network when the UE is handed over in an RRC connected mode. Moreover, RACH may be used for downlink and/or uplink data arrival when the UE is in the RRC idle or RRC inactive modes, and when reestablishing a connection with the network.

The RACH may be used during a RACH procedure. There are different types of RACH procedures, including a two-step RACH procedure and a four-step RACH procedure, illustrated in FIGS. 5-6, respectively.

Figure 5:
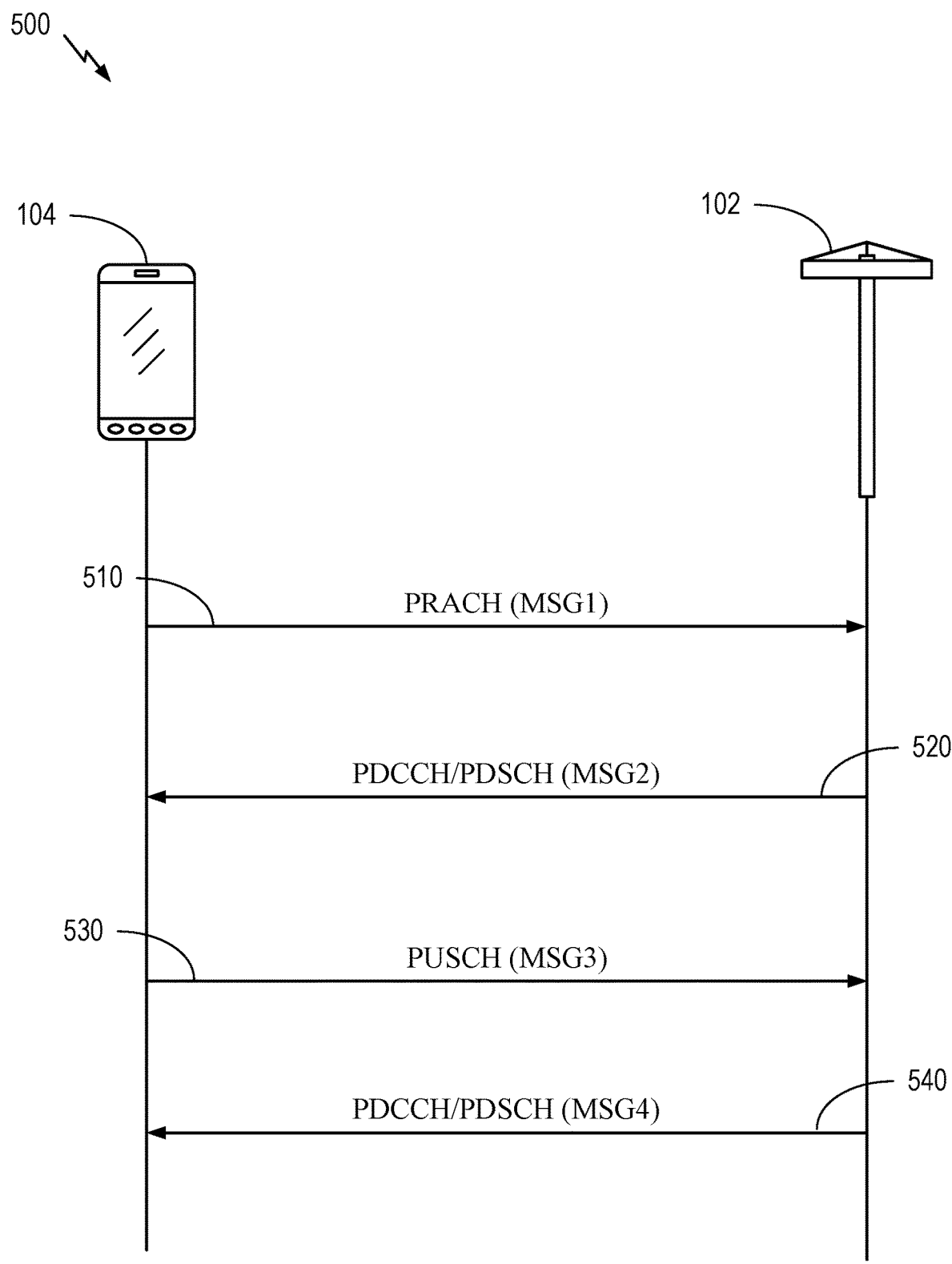
FIG. 5 depicts a call flow diagram for an example four step RACH procedure, which may be PDCCH ordered according to aspects of the present disclosure.

FIG. 5 is a call flow diagram illustrating an example four-step RACH procedure 500, in accordance with certain aspects of the present disclosure. As shown, at 510, a first message (MSG1) may be sent from a UE (e.g., such as a UE 104 in wireless communication network 100) to a BS (e.g., such as a BS 102 in wireless communication network 100) on a PRACH. In the four-step RACH procedure 500, the first message (MSG1) may only include a RACH preamble. At 520, the BS 102 may respond with a random access response (RAR) message (MSG2). The RAR message may include the identifier (ID) of the RACH preamble, a timing advance (TA), an uplink grant, a cell radio network temporary identifier (C-RNTI), and a back off indicator. The RAR message may include a PDCCH communication including control information for a following communication on a physical downlink shared channel (PDSCH). At 530, in response to the RAR message, UE 104 transmits a third message (MSG3) to the BS 102 on the physical uplink shared channel (PUSCH). The third message (MSG3) may include one or more of an RRC connection request, a tracking area update (TAU) request, a system information request, a positioning fix or positioning signal request, or a scheduling request (SR). The BS 102 then responds with a fourth message (MSG4) which may include a contention resolution message.

In some cases, to speed up access, a two-step RACH procedure may be supported. The two-step RACH procedure 600 may effectively "collapse" the four messages of the four-step RACH procedure 500 into two messages.

Figure 6:
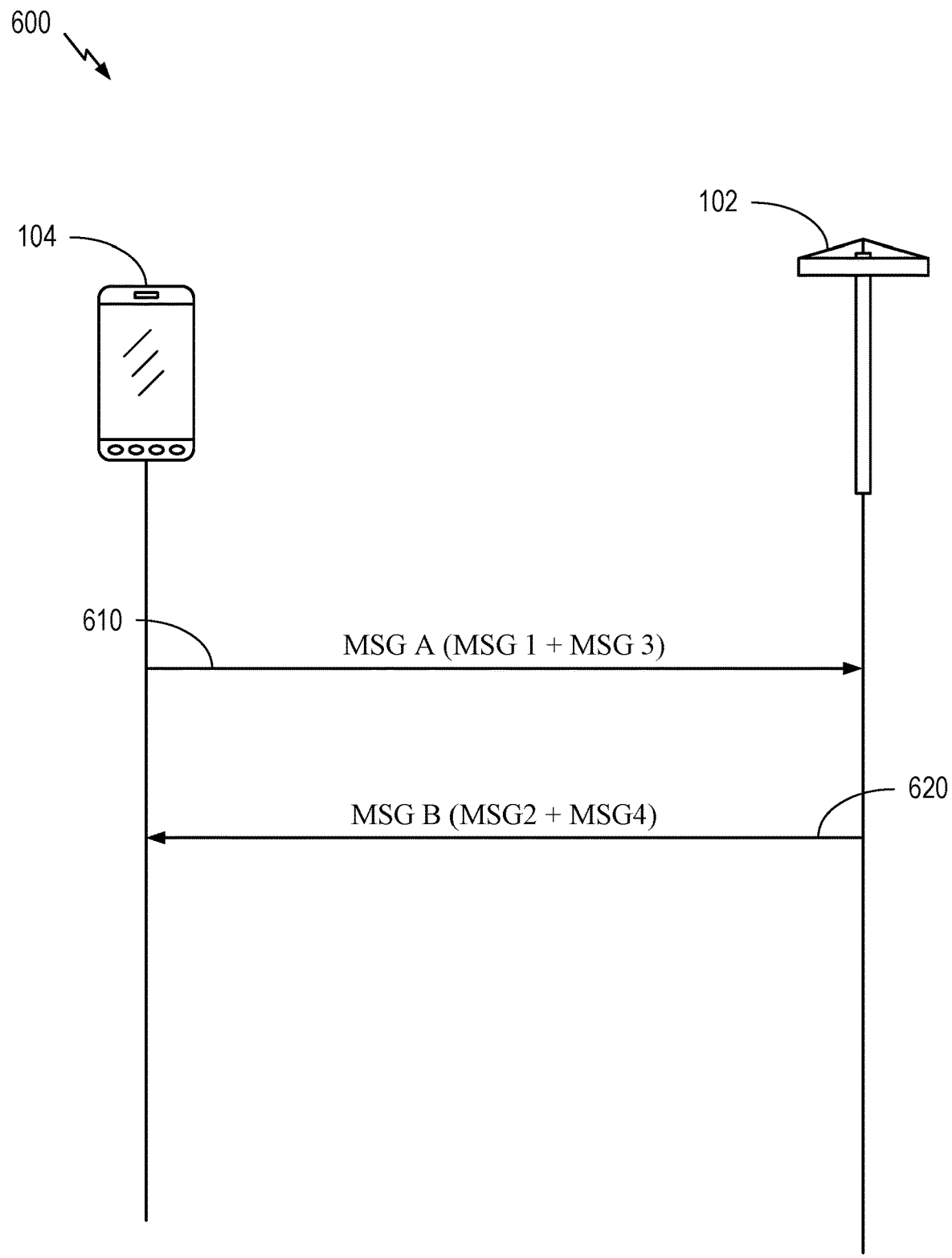
FIG. 6 depicts a call flow diagram for a two-step RACH procedure, which may be PDCCH ordered according to aspects of the present disclosure.

FIG. 6 is a call flow diagram illustrating an example two-step RACH procedure 600, in accordance with certain aspects of the present disclosure. As shown, at 610, a first enhanced message (MSG A) may be sent from the UE 104 to the BS 102. In certain aspects, the MSG A includes some or all the information from the MSG1 and the MSG3 from the four-step RACH procedure 500, effectively combining the MSG1 and MSG3 into a single message. For example, the MSG A may include the MSG1 and MSG3 multiplexed together, for example, using time-division multiplexing (TDM) or frequency-division multiplexing (FDM). In certain aspects, the MSG A includes a RACH preamble (e.g., MSG 1) for random access and a payload (e.g., MSG 3). The MSG A payload, for example, may include the UE-ID, a buffer status report (BSR), or an SR. At 620, the BS 102 may respond with an enhanced RAR message (MSG B) which may effectively combine the MSG2 and the MSG4 of the four-step RACH procedure 500 described above. For example, the MSG B may include the ID of the RACH preamble, the TA, the back off indicator, the contention resolution message, an uplink grant, a downlink grant, and a transmit power control (TPC) command.

Aspects Related to a PDCCH Ordered RACH Procedure for RedCap UEs

Aspects of the present disclosure provide techniques for enhancing a PDCCH ordered RACH procedure. In some aspects, the enhanced PDCCH ordered RACH procedure is based on capabilities of the UE. For example, the enhanced PDCCH ordered RACH procedure may be for reduced capability UEs. In certain aspects, the PDCCH ordered RACH procedure extends a minimum gap time. In certain aspects, the PDCCH ordered RACH procedure includes power control enhancements. In certain aspects, the PDCCH ordered RACH procedure includes coverage enhancement. In certain aspects, the PDCCH ordered RACH procedure includes DCI format enhancements. In certain aspects, the RACH-ordering PDCCH is multicast. In certain aspects, the enhanced PDCCH ordered RACH procedure is a 2-step RACH procedure.

PRACH transmissions from a UE can be triggered by higher layers or, as noted above, by a PDCCH order. The PDCCH ordering the PRACH transmissions may convey a DCI with multiple fields. In some aspects, the DCI in the RACH-ordering PDCCH include a field to indicate the type of RACH procedure, a field with an uplink carrier indicator, a field with PRACH resource mapping information, a field with power control parameters, a field with coverage enhancement schemes, and/or fields with other scheduling information. The DCI may be for one or multiple UEs.

In some aspects, a contention-based random access (CBRA) procedure or a contention-free random access (CFRA) procedure can be ordered by a DCI format 1_0 scrambled by a C-RNTI. The DCI may include a frequency domain resource allocation (FDRA) field, an uplink/secondary uplink (UL/SUL) indicator field, a synchronization signal block (SSB) index field, a PRACH mask index field, and one or more reserved bits field. The FDRA field may include bits set to a special value (e.g., all '1') to indicate the DCI is to order a RACH procedure.

As noted above, for a PDCCH ordered PRACH transmission, a UE may require a minimum gap between the last symbol of the PDCCH order reception and the first symbol of PRACH transmission of 4-step RACH to provide sufficient processing time. This minimum bap may be defined as:

$$G_{min}=N_{T,2}+\Delta_{BWPSwitching}+\Delta_{Delay}+T_{switch},$$

where $N_{T,2}$ is a time duration of $N_2$ symbols corresponding to a PUSCH preparation time for a UE processing capability (assuming the subcarrier spacing (SC S), p, corresponds to the smaller SCS configuration of the SCS configuration of the PDCCH order and the SCS configuration of the corresponding PRACH transmission); $\Delta_{BWPSwitching}$ may be set to 0 if the active UL bandwidth part (BWP) does not change (e.g., between the RACH ordering-PDCCH and the PRACH) and may be defined in a standard; the value of $\Delta_{Delay}$ may depend on the operating frequency range (e.g., $\Delta_{Delay}$=0.5 ms for FR1 and $\Delta_{Delay}$=0.25 ms for FR2); and Twitch is a switching gap duration, which may be defined in a standard.

As discussed above, RedCap UEs may have reduced capabilities with respect to 'normal' capability UEs (e.g., non-RedCap UEs). For example, RedCap UEs may have reduced maximum UE bandwidth, reduced number of transmit/receive (TX/RX) antennas, reduced antenna efficiency (e.g., for devices with size limitation, such as wearable devices), HD operation in FDD bands, and/or a relaxed processing timeline at various layers (L1/L2/L3).

According to certain aspects, the minimum gap between the RACH-ordering PDCCH and the RACH message (e.g., a MSG 1 transmission in a 4-step RACH procedure or a MSG A transmission in a 2-step RACH procedure). For a PDCCH ordered RACH procedure for a RedCap UE, the minimum gap between the last symbol of the RACH-ordering PDCCH and the first symbol of the RACH message transmission may be extended. According to certain aspects, the extended minimum gap ($G_{min,ext}$) may be defined as:

$$G_{min,ext}=\alpha \cdot N_{T,ext}\Delta_{BWPSwitching,ext}+\Delta_{HD\text{-}Switching}+\Delta_{Delay,ext}+T_{switch,ext}$$

The parameter $\alpha$ is a scaling factor greater than one (a>1) which depends on the type of RACH procedure and a CE level (k) for the RACH message transmission. For example, if the PDCCH orders a Type-1 (four-step) RACH procedure and the CE level is k for the PDCCH ordered MSG 1, then $\alpha$ may be set to k ($\alpha$=k). On the other hand, if the PDCCH orders a Type-2 (two-step) RACH procedure and the CE level is k for the PDCCH ordered MSG A, then $\alpha$ may be set to 2k ($\alpha$=2k). The parameter $N_{T,ext}$ is a time duration of $N_{ext}$ symbols corresponding to a PRACH/PUSCH preparation time, which may depends on the UE capability and a minimum of an SCS configuration for PDCCH and a reference SCS for PRACH. The parameter $\Delta_{BWPSwitching,ext}$ may be set to zero if the UE does not change the active UL BWP in transmitting the PDCCH ordered RACH message (e.g., MSG 1 or MSG A) and, otherwise, $\Delta_{BWPSwitching,ext}$ may depend on the UE capability. The parameter $\Delta_{HD\text{-}Switching}$ is the DL-to-UL (i.e., DL reception to UL transmission) switching time of HD-FDD operation, which depends on the UE capability. The parameter $\Delta_{Delay,ext}$ is a delay duration that may depend on the UE capability and on the operating frequency range (FR) and SSB periodicity. The parameter $T_{switch,ext}$ is an UL switching gap, which may depend on the UE capability and also on an UL TX switching option.

Figure 7:
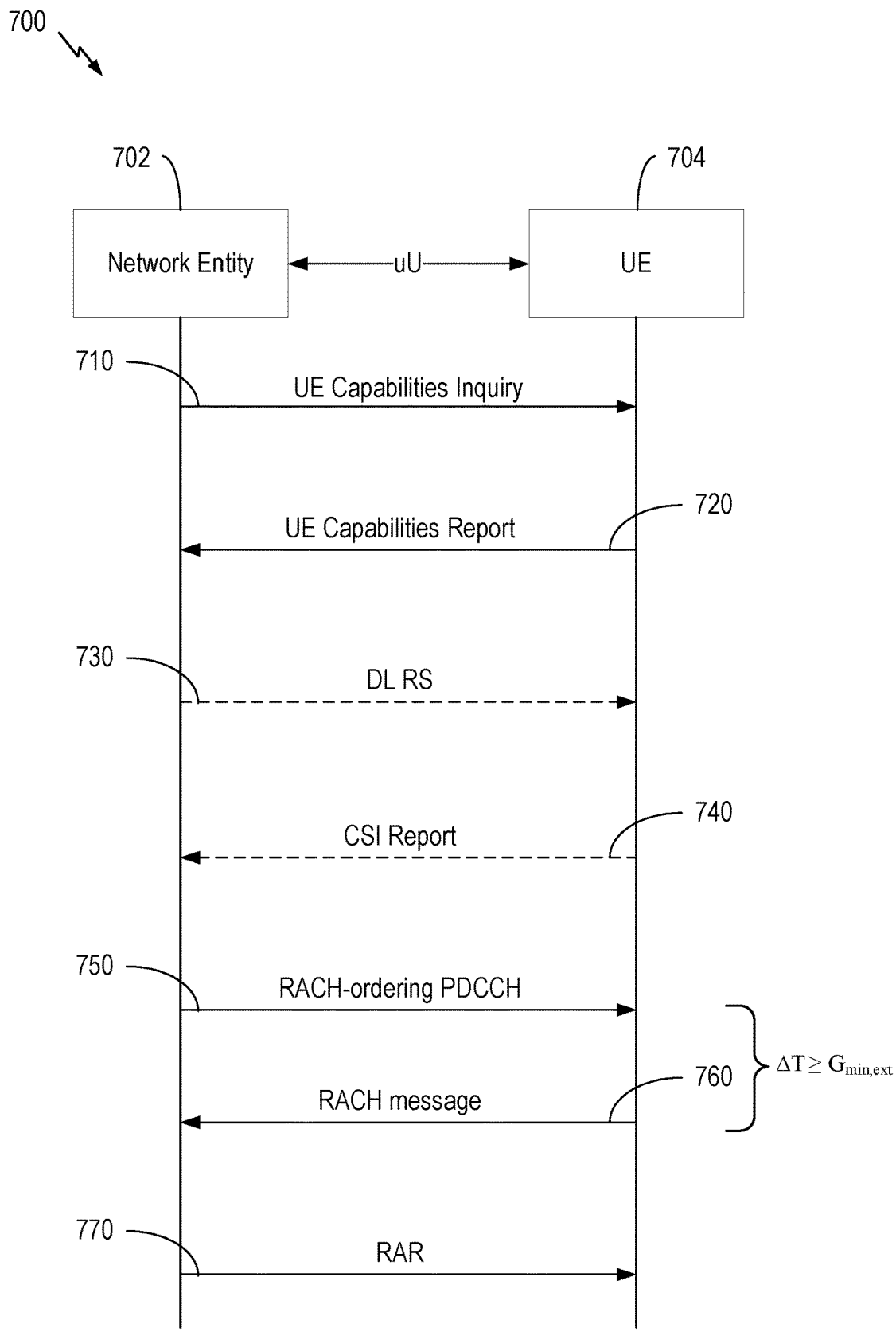
FIG. 7 depicts a call flow diagram of an example PDCCH ordered RACH procedure, according to aspects of the present disclosure.

FIG. 7 depicts a call flow diagram of an example PDCCH ordered RACH procedure 700, according to aspects of the present disclosure.

As illustrated, at 710, a network entity 702 (e.g., a BS 102 in wireless communication network 100) may send a request (inquiry) to UE 704 (e.g., a UE 104 in wireless communication network 100) for the UE capabilities. At 720, in response to the inquiry, UE 704 reports its capabilities to the network entity 702. The content of the UE capabilities report related to PDCCH ordered RACH may include an indication of whether the UE supports or does not support: Type-2 (2-step) RACH, HD-FDD, SUL, and/or CE for MSG 1 or MSG A, the UE processing capability for PDCCH, PDSCH, and/or PUSCH, and a radio frequency (RF) retuning capability of the UE (e.g., for BWP switching, carrier switching, and the like).

Optionally, at 730, network entity 702 transmits one or more downlink reference signals (DL RS) to UE 704. The downlink reference signals may include SSBs, channel state information reference signals (CSI-RSs), tracking reference signals (TRS), and/or positioning reference signals (PRS). The UE 704 may measure the downlink reference signals to generate CSI feedback. Optionally, at 740, UE 704 may send a CSI report to the network entity 702 with the CSI feedback. The content of the CSI report related to PDCCH ordered RACH may include information, such as reference signal received power (RSRP) measurements and/or preferred beam indexes associated with the downlink reference signals.

At 750, network entity 702 sends a RACH-ordering PDCCH to UE 704. In some aspects, network entity 702 determines a DCI payload of the RACH-ordering PDCCH and the minimum gap, $G_{min,ext}$, based, at least in part, on the reported UE capabilities and the CSI. The network entity 702 may ensure the timing of the ordered RACH transmission satisfies the $G_{min,ext}$. In some aspects, the network entity 702 determines a RACH message resource for the UE 704 that satisfies the minimum gap between the RACH-ordering PDCCH and the RACH message. In some aspects, the network entity 702 determines a downlink reference signal resource configuration, a downlink reference signal periodicity configuration, an association between the downlink reference and the RACH message resource(s), a CBRA or CFRA mode, and/or a type of RACH procedure (Type-1 or Type-2).

The UE 704 may decode the RACH-ordering PDCCH and prepare for a RACH message (e.g., MSG 1 or MSG A) transmission. An UL carrier and/or a BWP may be explicitly or implicitly indicated by the DCI payload of the RACH-ordering PDCCH. At 760, UE 704 transmits the RACH message to the network entity 702. At 770, the network entity 702 sends a RAR message (e.g., a MSG 2 or a MSG B) to UE 704.

A duration ΔT between a last symbol of the RACH-ordering PDCCH (at 750) and a first symbol of the RACH message (at 760) is greater than the minimum gap ($\Delta T \geq G_{min,ext}$).

According to certain aspects, PDCCH signaling may be enhanced to support PDCCH ordered RACH procedures for RedCap UEs, PDCCH ordered RACH procedures with uplink power control, and PDCCH ordered RACH procedures with CE.

In some aspects, both the Type 1 RACH-ordering PDCCH and the Type 2 RACH-ordering PDCCH may include, an UL BWP ID (e.g., in the NUL/SUL field).

Additional signaling information may be mapped to the RACH-ordering PDCCH. For example, for both a Type 1 RACH-ordering PDCCH and the Type 2 RACH-ordering PDCCH, the additional signaling information may include, in addition to an FDRA field, a PRACH preamble index, a PRACH preamble group index, an UL/SUL indicator, a downlink reference index, and/or a PRACH mask index. In some cases, the indication of the RACH type can be mapped to the FDRA field (e.g., all '1s' or all '0s' may indicate Type 1 RACH while the opposite values indicate Type 2 RACH) or to the PRACH preamble index, the PRACH group index, or the PRACH mask index.

In addition, for both a Type 1 RACH-ordering PDCCH and the Type 2 RACH-ordering PDCCH, the additional signaling information may include, a RACH type indicator, one or more power control parameters, and/or one or more CE parameters. The RACH type indicator may indicate the Type 1 RACH or the Type 2 RACH. The RACH-ordering PDCCH may further indicate whether the RACH procedure is a CBRA or CFRA procedure. The one or more CE parameters may include a repetition parameter, a frequency hopping parameter, etc., for the RACH message. The CE parameters for the Type 1 RACH-ordering PDCCH may indicate the CE for the MSG 1 and the CE parameters for the Type 2 RACH-ordering PDCCH may indicate the CE for the MSG PRACH.

The power control parameters may depend at least on the type of RACH procedure (Type 1 or Type 2), the power control scheme (closed-loop or open-loop), and the contention resolution scheme (CFRA or CBRA). In some cases, the RACH-ordering PDCCH power control parameters includes an indicator of ul-FullPowerTransmission for the PRACH preamble and/or PUSCH, a TPC command for the PRACH preamble and/or the PUSCH, a transmit (TX) power ramp-up for the PRACH preamble and/or the PUSCH, and/or a TX power offset between the PRACH preamble and the PUSCH.

In some aspects, the Type-2 RACH ordering PDCCH further includes additional parameters for the MSG A PUSCH. The additional parameters may include one or more power control parameters, hybrid automatic repeat request (HARD) parameters, modulation and coding scheme (MCS) parameters, CE parameters (e.g., transport block (TB) scaling parameters, repetition parameters, slot aggregation parameters, and/or frequency hopping parameters), and/or demodulation reference signal (DMRS) bundling parameters for the MSG A PUSCH.

According to certain aspects, the RACH-ordering PDCCH may be unicast and/or multicast to support UE multiplexing. For example, for a single UE, the DCI of the RACH-ordering PDCCH may be scrambled by a UE-specific RNTI and unicast. For multiple UEs, the DCI of the RACH-ordering PDCCH may be scrambled by a group RNTI and multicast to a group of one or multiple UEs, which may reduce signaling overhead when triggering a RACH procedure for the group of UEs.

Example Methods

Figure 8:
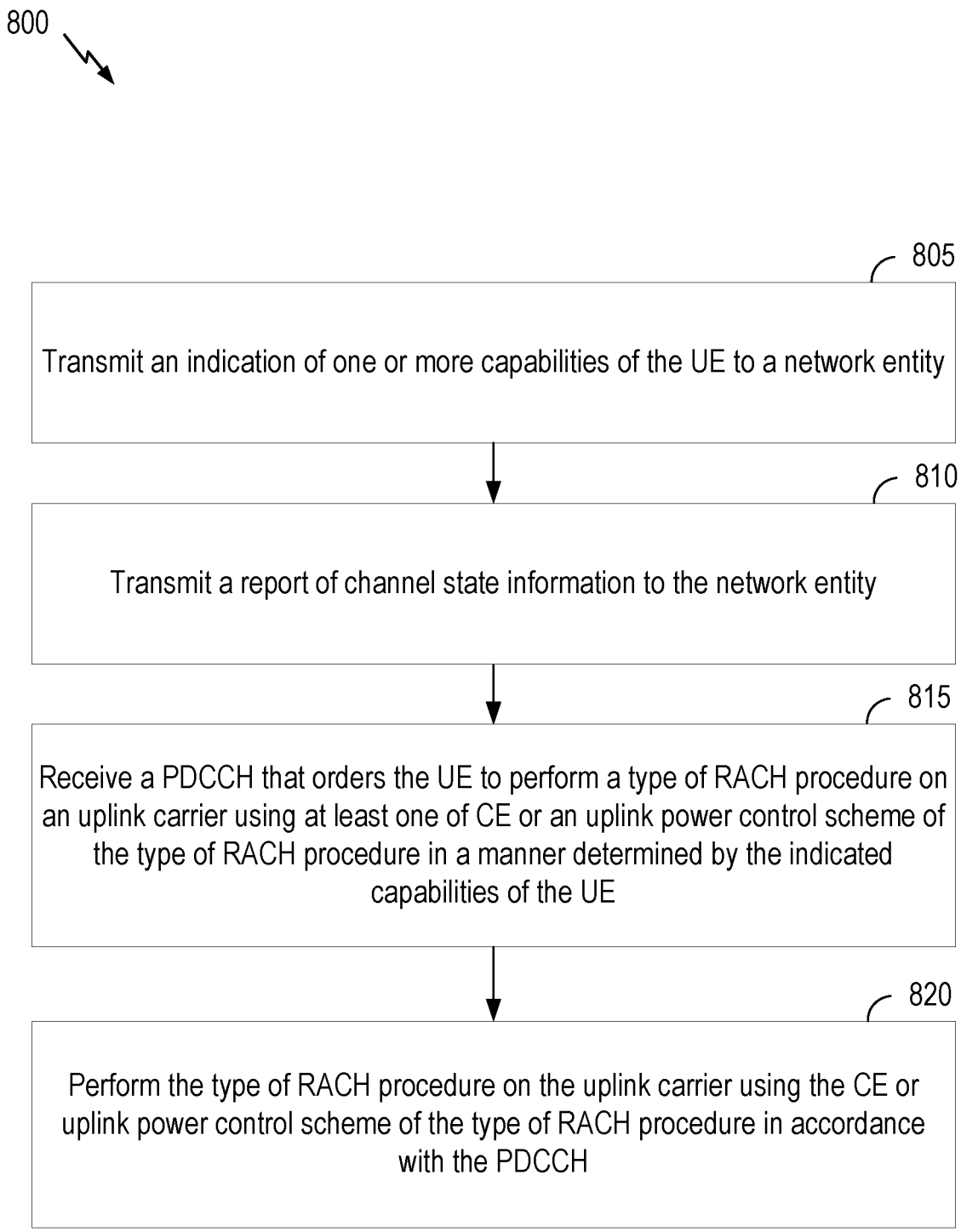
FIG. 8 shows example operations by a UE for a PDCCH ordered RACH procedure, according to aspects of the present disclosure.

FIG. 8 shows an example of a method 800 for performing a PDCCH ordered RACH procedure according to aspects of the present disclosure. In some aspects, a UE, such as UE 104 in FIG. 1 and FIG. 2, or processing system 1205 of FIG. 12, may perform the method 800.

At operation 805, the system transmits an indication of one or more capabilities of the UE to a network entity. In some cases, the operations of this step refer to, or may be performed by, UE capability circuitry as described with reference to FIG. 12.

At operation 810, the system transmits a report of channel state information to the network entity. In some cases, the operations of this step refer to, or may be performed by, CSI report circuitry 1222 as described with reference to FIG. 12.

At operation 815, the system receives a PDCCH that orders the UE to perform a type of RACH procedure on an uplink carrier using at least one of CE or an uplink power control scheme of the type of RACH procedure in a manner determined by the indicated capabilities of the UE. In some cases, the operations of this step refer to, or may be performed by, PDCCH receiver circuitry 1223 as described with reference to FIG. 12.

At operation 820, the system performs the type of RACH procedure on the uplink carrier using the CE or uplink power control scheme of the type of RACH procedure in accordance with the PDCCH. In some cases, the operations of this step refer to, or may be performed by, RACH procedure circuitry 1224 as described with reference to FIG. 12.

In some aspects, the PDCCH indicates whether the RACH procedure comprises a first type of RACH procedure in which the UE transmits a first type of RACH message that includes a PRACH preamble or a second type of RACH procedure in which the UE transmits a second type of RACH message that comprises a composite a PRACH preamble and a PUSCH, and the first type of RACH message or the second type of RACH message can be transmitted on a regular (e.g., normal) or a supplementary uplink carrier signaled by the PDCCH.

In some aspects, the PDCCH indicates whether the RACH procedure comprises the first type of RACH procedure or second type of RACH procedure via bits at least in a FDRA field, a DMRS configuration of the PDCCH, an index of a PRACH preamble or preamble group, or an index of a PRACH mask.

In some aspects, the indicated capabilities of the UE comprise at least one of: a capability of the UE to support the second type of RACH procedure, a capability of the UE to support CE, a capability of the UE to support HD FDD, a RF retuning capability of the UE, or a capability of the UE for processing PDCCH, PUSCH, or PUSCH transmissions.

In some aspects, the method 800 includes determining a minimum gap based, at least in part, on the indicated capabilities of the UE. In some aspects, the method 900 further includes performing the RACH procedure only if a time between a last symbol of the PDCCH and a first symbol of the first type of RACH message or second type of RACH message is equal to or greater than the minimum gap.

In some aspects, the minimum gap is determined based on at least one of the type of RACH procedure, a CE capability of the UE, a UE processing capability for PDCCH, PRACH or PUSCH, and a minimum SCS configuration for the PDCCH, the PRACH or the PUSCH. In some aspects, the minimum gap is determined based on at least one of a BWP switching delay that depends on UE capability or an HD FDD switching delay that depends on UE capability. In some aspects, the minimum gap is determined based on at least one of an uplink switching gap that depends on UE capability and an uplink transmission switching option or a delay extension that depends on UE capability, an operating FR, a QCL or TCI state, and a SSB or downlink reference signal configuration of a serving cell.

In some aspects, the at least one CE comprises at least one of repetition for PRACH, a repetition for PUSCH, frequency hopping for PRACH, frequency hopping for PUSCH, or DMRS bundling for PUSCH.

In some aspects, the PDCCH indicates whether the RACH procedure comprises a first type of RACH procedure in which the UE transmits a first type of RACH message that includes a PRACH preamble or a second type of RACH procedure in which the UE transmits a second type of RACH message that comprises a composite PRACH preamble and PUSCH. In some aspects, the PDCCH indicates at least one of one or more power control parameters for first or second type of RACH message, or one or more CE schemes for the first type of RACH message or second type of RACH message, and a set of modulation, coding and HARQ processing parameters for the PUSCH of the second type of RACH message.

In some aspects, the power control parameters depend on at least one of the type of RACH procedure, a power control scheme, a TCI or QCL state, or a contention resolution scheme for the RACH procedure type. In some aspects, the power control parameters comprise at least one of: an indicator of uplink full power transmission parameter, a TCI or QCL state, a TPC command, a transmit power ramp-up parameter, or a transmit power offset between PRACH and PUSCH.

In some aspects, the PDCCH comprises a groupcast PDCCH transmitted in a CSS set and a payload or CRC bits of the payload is scrambled by a group RNTI.

Figure 9:
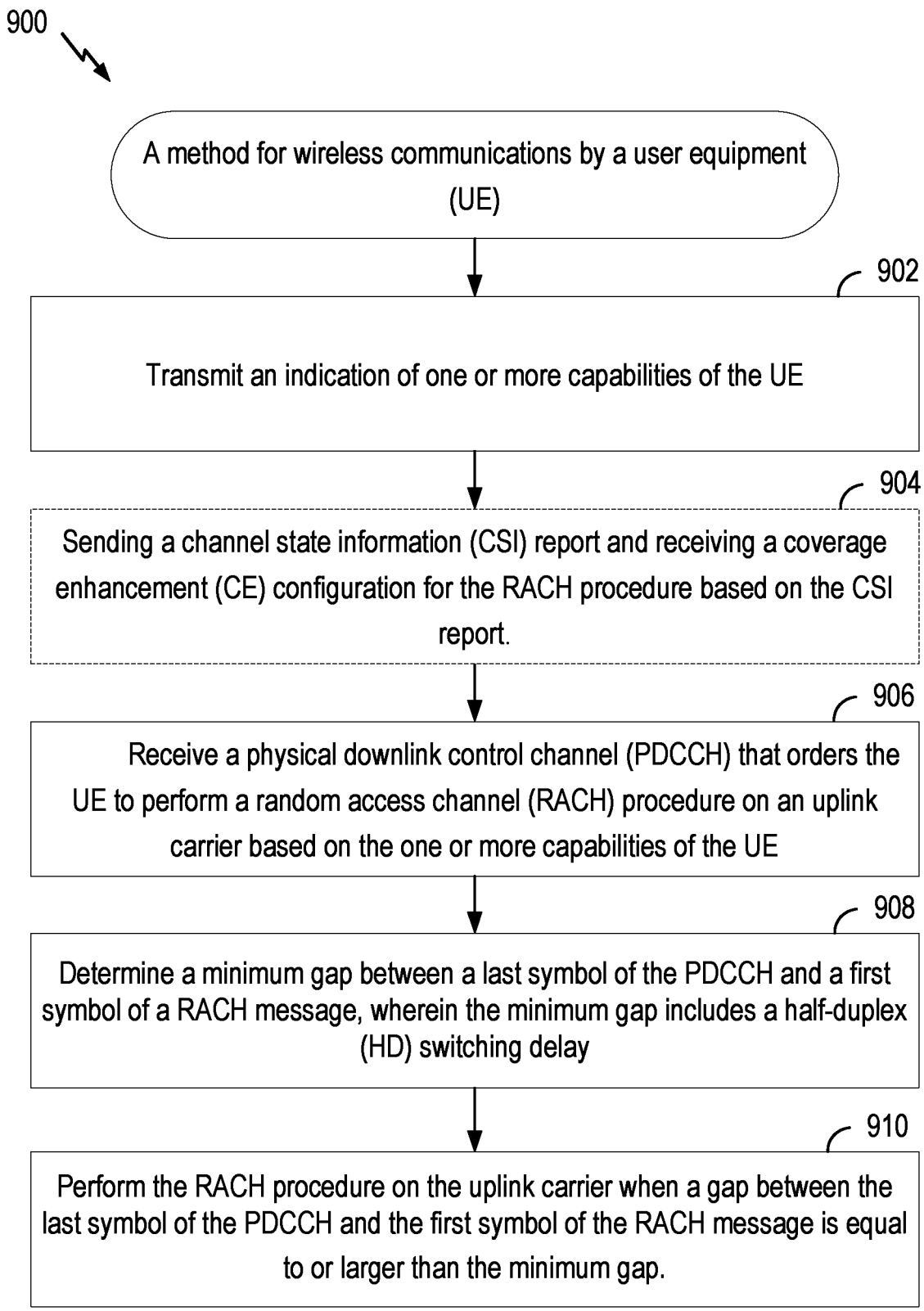
FIG. 9 shows example operations by a UE for a PDCCH ordered RACH procedure, according to aspects of the present disclosure.

FIG. 9 shows an example of a method 900 for performing a PDCCH ordered RACH procedure according to aspects of the present disclosure. In some aspects, a UE, such as UE 104 in FIG. 1 and FIG. 2, or processing system 1205 of FIG. 12, may perform the method 900.

At 902, method 900 includes transmitting an indication of one or more capabilities of the UE.

Optionally, at 904, method 900 may include sending a CSI report and receiving a CE configuration for the RACH procedure based on the CSI report.

At 906, method 900 includes receiving a PDCCH that orders the UE to perform a RACH procedure on an uplink carrier based on the one or more capabilities of the UE.

At 908, method 900 includes determining a minimum gap between a last symbol of the PDCCH and a first symbol of a RACH message. The minimum gap may include a HD switching delay.

At 910, method 900 includes performing the RACH procedure on the uplink carrier when a gap between the last symbol of the PDCCH and the first symbol of the RACH message is equal to or larger than the minimum gap.

FIG. 10 shows an example of a method 1000 for ordering a RACH procedure according to aspects of the present disclosure. In some aspects, a B S, such as a B S 102 in FIG. 1 and FIG. 2, or processing system 1305 of FIG. 13, may perform the method 1000.

At operation 1005, the system transmits, to at least one UE, a PDCCH that orders the UE to perform a type of RACH procedure using at least one of a CE or a power control scheme in a manner determined by indicated capabilities of the UE. In some cases, the operations of this step refer to, or may be performed by, PDCCH circuitry 1321 as described with reference to FIG. 13.

At operation 1010, the system participates in the type of RACH procedure with the UE in accordance with the PDCCH and the indicated capabilities of the UE. In some cases, the operations of this step refer to, or may be performed by, RACH procedure circuitry 1322 as described with reference to FIG. 13.

In some aspects, the PDCCH indicates whether the RACH procedure comprises a first type of RACH procedure in which the UE transmits a first type of RACH message that includes a PRACH preamble or a second type of RACH procedure in which the UE transmits a second type of RACH message that comprises a composite PRACH preamble and PUSCH; and wherein the first type of RACH message or the second type of RACH message can be transmitted on a regular (e.g., normal) or a supplementary uplink carrier signaled by the PDCCH.

In some aspects, the PDCCH indicates whether the RACH procedure comprises the first type of RACH procedure or second type of RACH procedure via bits at least in a FDRA field of DCI conveyed by the PDCCH, a DMRS configuration of the PDCCH, an index of a PRACH preamble or preamble group, or an index of a PRACH mask.

In some aspects, the indicated capabilities of the UE comprise at least one of: a capability of the UE to support the second type of RACH procedure, a capability of the UE to support CE, a capability of the UE to support HD FDD, a RF retuning capability of the UE, or a capability of the UE for processing PDCCH, PUSCH, or PUSCH transmissions.

In some aspects, the method 1000 includes determining a minimum gap based, at least in part, on the indicated capabilities of the UE. In some aspects, the method 1000 further includes scheduling the UE, via the PDCCH, to perform the RACH procedure such that a time between a last symbol of the PDCCH and a first symbol of the first type of RACH message or the second type of RACH message is equal to or greater than the minimum gap.

In some aspects, the minimum gap is determined based on at least one of the type of RACH procedure, a CE capability of the UE, a UE processing capability for PDCCH, PRACH or PUSCH, or a minimum SCS configuration for the PDCCH, the PRACH or the PUSCH. In some aspects, the minimum gap is determined based on at least one of a BWP switching delay that depends on UE capability or an HD FDD switching delay that depends on UE capability. In some aspects, the minimum gap is determined based on at least one of an uplink switching gap that depends on UE capability and an uplink transmission switching option or a delay extension that depends on UE capability, an operating FR, a QCL or TCI state, and a SSB or downlink reference signal configuration of a serving cell.

In some aspects, the at least one UE comprises a group of UEs; and the PDCCH comprises a groupcast PDCCH transmitted in a CSS set and a payload or CRC bits of the payload is scrambled by a group RNTI.

In some aspects, the CE comprises at least one of repetition for PRACH, a repetition for PUSCH, frequency hopping for PRACH, frequency hopping for PUSCH, or DMRS bundling for PUSCH.

In some aspects, the PDCCH indicates whether the RACH procedure comprises a first type of RACH procedure in which the UE transmits a first type of RACH message that includes a PRACH preamble or a second type of RACH procedure in which the UE transmits a second type of RACH message that comprises a composite PRACH preamble and PUSCH, and where the PDCCH indicates at least one of one or more power control parameters for the first type of RACH message or the second type of RACH message, or one or more CE schemes for the first type of RACH message or the second type of RACH message, or a set of modulation, coding and HARQ processing parameters for msgA PUSCH.

In some aspects, the power control parameters depend on at least one of the type of RACH procedure, a QCI or TCI state, a CSI report, a power control scheme, or a contention resolution scheme for the RACH procedure type. In some aspects, the power control parameters comprise at least one of: an indicator of uplink full power transmission parameter, a QCL or TCI, a TPC command, a transmit power ramp-up parameter, or a transmit power offset between PRACH and PUSCH.

Figure 11:
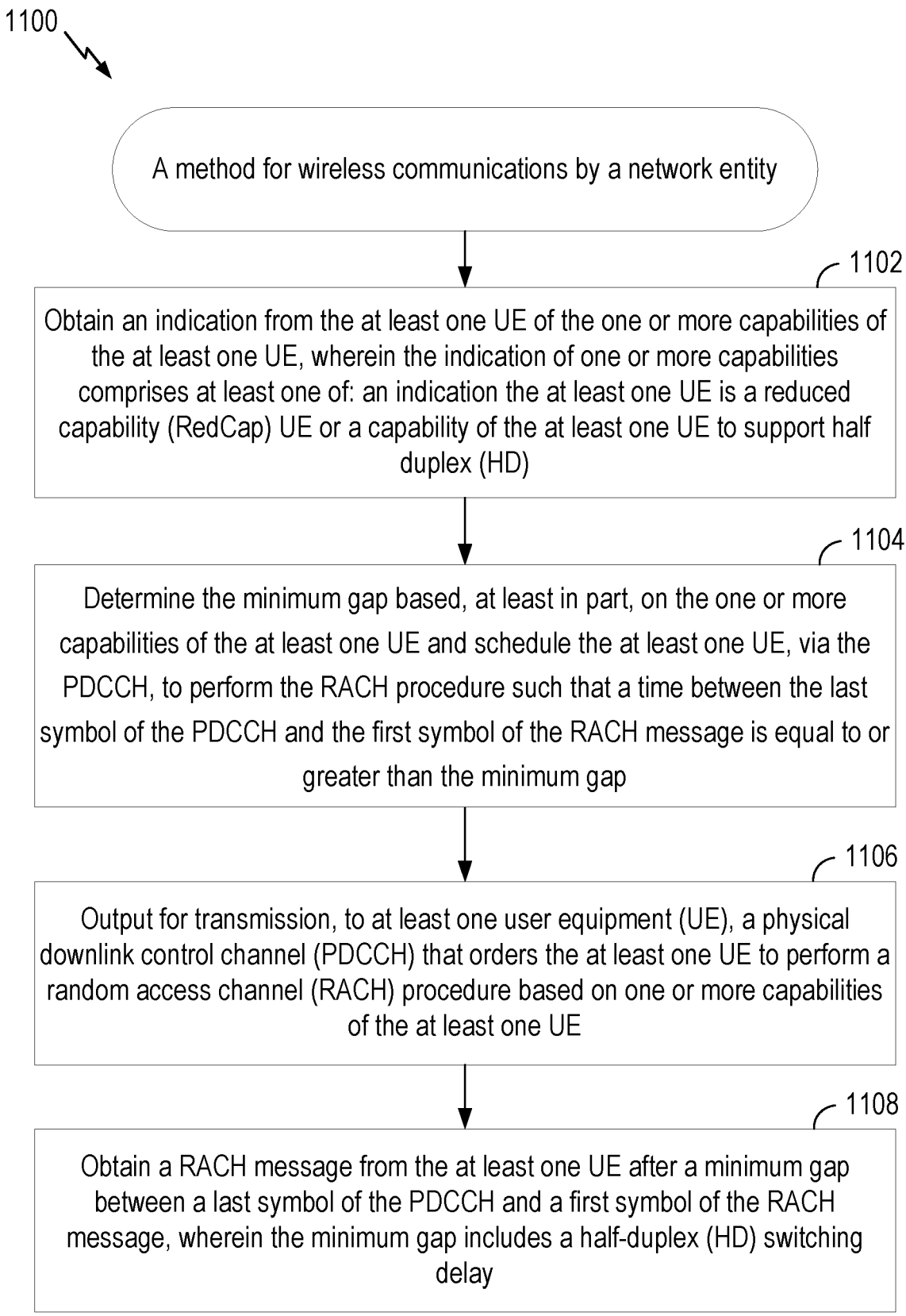
FIG. 11 shows example operations by a network entity for a PDCCH ordered RACH procedure, according to aspects of the present disclosure.

FIG. 11 shows an example of a method 1100 for ordering a RACH procedure according to aspects of the present disclosure. In some aspects, a BS, such as a BS 102 in FIG. 1 and FIG. 2, or processing system 1305 of FIG. 13, may perform the method 1100.

Optionally, at 1102, method 1100 includes obtaining an indication from the at least one UE of the one or more capabilities of the at least one UE. The indication of one or more capabilities comprises at least one of: an indication the at least one UE is a RedCap UE or a capability of the at least one UE to support HD.

Optionally, at 1104, method 1100 includes determining the minimum gap based, at least in part, on the one or more capabilities of the at least one UE and scheduling the at least one UE, via the PDCCH, to perform the RACH procedure such that a time between the last symbol of the PDCCH and the first symbol of the RACH message is equal to or greater than the minimum gap.

At 1106, method 1100 includes outputting for transmission, to at least one UE, a PDCCH that orders the at least one UE to perform a RACH procedure based on one or more capabilities of the at least one UE.

At 1108, method 1100 includes obtaining a RACH message from the at least one UE after a minimum gap between a last symbol of the PDCCH and a first symbol of the RACH message. The minimum gap includes a HD switching delay.

Example Wireless Communication Devices

Figure 12:
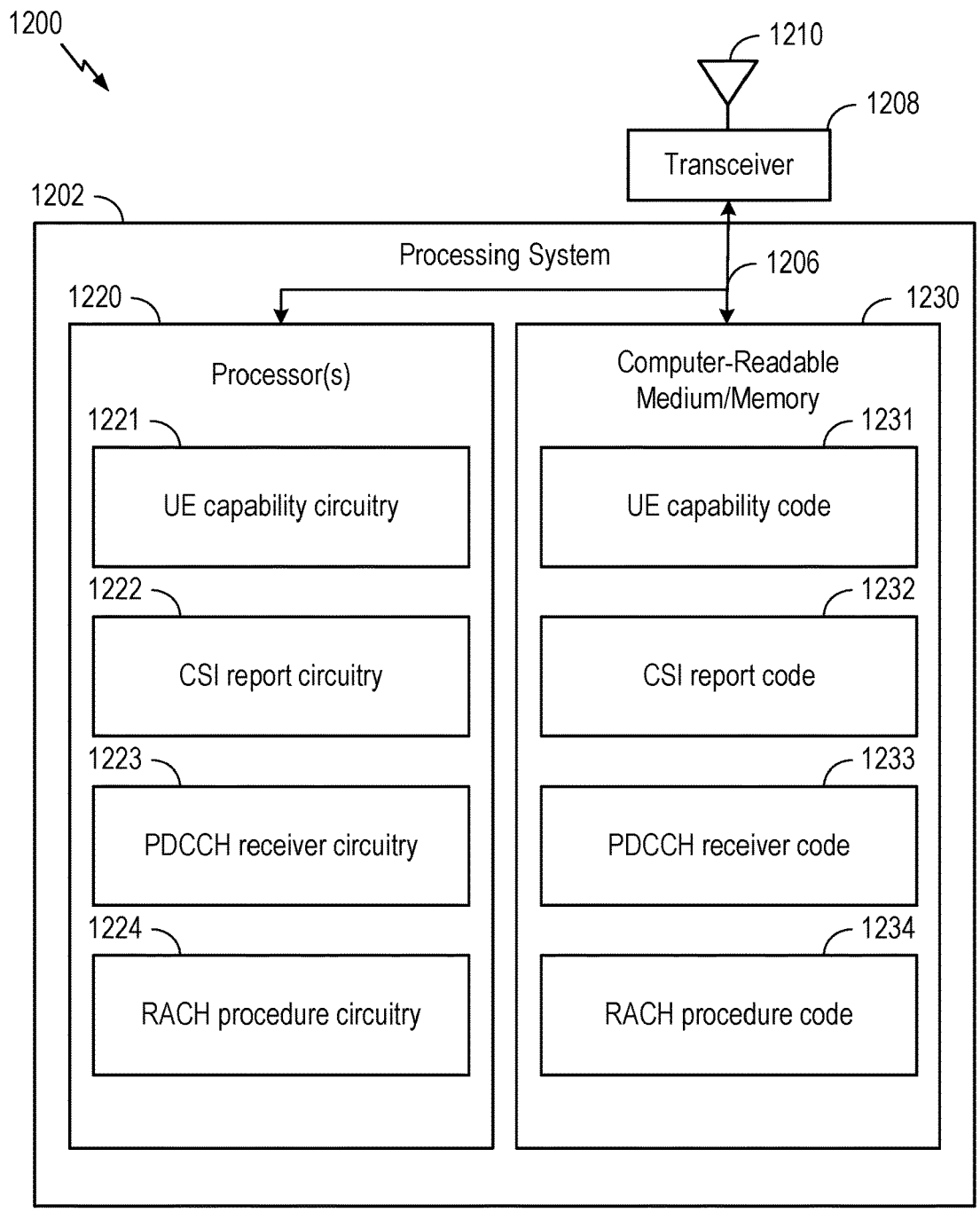
FIG. 12 shows examples of a communications device according to aspects of the present disclosure.

FIG. 12 depicts an example communications device 1200 that includes various components operable, configured, or adapted to perform operations for the techniques disclosed herein, such as the operations depicted and described with respect to FIG. 8 and FIG. 9. In some examples, communication device 1200 may be a UE 104 as described, for example with respect to FIG. 1 and FIG. 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 8 and FIG. 9, or other operations for performing the various techniques discussed herein.

Various components of communications device 1200 may provide means for performing the methods described herein, including with respect to FIG. 8 and FIG. 9.

In some examples, means for transmitting or sending (or means for outputting for transmission) may include the transceivers 254 and/or antenna(s) 252 of the UE 104 illustrated in FIG. 2 and/or transceiver 1208 and antenna 1210 of the communication device in FIG. 12.

In some examples, means for receiving (or means for obtaining) may include the transceivers 254 and/or antenna(s) 252 of the UE 104 illustrated in FIG. 2 and/or transceiver 1208 and antenna 1210 of the communication device in FIG. 12.

In some examples, means for performing and/or participating may include various processing system 1202 components, such as: the one or more processors 1220 in FIG. 12, or aspects of the UE 104 depicted in FIG. 12, including receive processor 258, transmit processor 264, TX MIMO processor 266, and/or controller/processor 280.

In one aspect, one or more processors 1220 include UE capability circuitry 1221, CSI report circuitry 1222, PDCCH receiver circuitry 1223, and RACH procedure circuitry 1224.

According to some aspects, UE capability circuitry 1221 transmits an indication of one or more capabilities of the UE to a network entity. In some examples, the indicated capabilities of the UE include at least one of: a capability of the UE to support the second type of RACH procedure, a capability of the UE to support CE, a capability of the UE to support HD FDD, a RF retuning capability of the UE, or a capability of the UE for processing PDCCH, PUSCH, or PUSCH transmissions. In some examples, UE capability circuitry 1221 determines a minimum gap based, at least in part, on the indicated capabilities of the UE. In some examples, the minimum gap is determined based on at least one of the type of RACH procedure, a CE capability of the UE, a UE processing capability for PDCCH, PRACH or PUSCH, and a minimum SCS configuration for the PDCCH, the PRACH or the PUSCH. In some examples, the minimum gap is determined based on at least one of a BWP switching delay that depends on UE capability or an HD FDD switching delay that depends on UE capability. In some examples, the minimum gap is determined based on at least one of an uplink switching gap that depends on UE capability and an uplink transmission switching option or a delay extension that depends on UE capability, an operating FR, a QCL or TCI state, and a SSB or downlink reference signal configuration of a serving cell.

According to some aspects, CSI report circuitry 1222 transmits a report of channel state information to the network entity.

According to some aspects, PDCCH receiver circuitry 1223 receives a PDCCH that orders the UE to perform a type of RACH procedure on an uplink carrier using at least one of CE or an uplink power control scheme of the type of RACH procedure in a manner determined by the indicated capabilities of the UE. In some examples, the PDCCH indicates whether the RACH procedure includes a first type of RACH procedure in which the UE transmits a first type of RACH message that includes a PRACH preamble or a second type of RACH procedure in which the UE transmits a second type of RACH message that includes a composite a PRACH preamble and a PUSCH, and where the first type of RACH message or the second type of RACH message can be transmitted on a regular (e.g., normal) or a supplementary uplink carrier signaled by the PDCCH. In some examples, the PDCCH indicates whether the RACH procedure includes the first type of RACH procedure or second type of RACH procedure via bits at least in a FDRA field, a DMRS configuration of the PDCCH, an index of a PRACH preamble or preamble group, or an index of a PRACH mask. In some examples, the at least one CE includes at least one of repetition for PRACH, a repetition for PUSCH, frequency hopping for PRACH, frequency hopping for PUSCH, or DMRS bundling for PUSCH.

In some examples, the PDCCH indicates whether the RACH procedure includes a first type of RACH procedure in which the UE transmits a first type of RACH message that includes a PRACH preamble or a second type of RACH procedure in which the UE transmits a second type of RACH message that includes a composite PRACH preamble and PUSCH, and where the PDCCH indicates at least one of one or more power control parameters for first or second type of RACH message, or one or more CE schemes for the first type of RACH message or second type of RACH message, and a set of modulation, coding and HARQ processing parameters for the PUSCH of the second type of RACH message. In some examples, the power control parameters depend on at least one of the type of RACH procedure, a power control scheme, a TCI or QCL state, or a contention resolution scheme for the RACH procedure type. In some examples, the power control parameters include at least one of: an indicator of uplink full power transmission parameter, a TCI or QCL state, a TPC command, a transmit power ramp-up parameter, or a transmit power offset between PRACH and PUSCH. In some examples, the PDCCH includes a groupcast PDCCH transmitted in a CSS set and a payload or CRC bits of the payload is scrambled by a group RNTI.

According to some aspects, RACH procedure circuitry 1224 performs the type of RACH procedure on the uplink carrier using the CE or uplink power control scheme of the type of RACH procedure in accordance with the PDCCH. In some examples, RACH procedure circuitry 1224 performs the RACH procedure only if a time between a last symbol of the PDCCH and a first symbol of the first type of RACH message or second type of RACH message is equal to or greater than the minimum gap.

In one aspect, computer-readable medium/memory 1230 includes (e.g., stores) UE capability code 1231, CSI report code 1232, PDCCH receiver code 1233, and RACH procedure code 1234.

Notably, FIG. 12 is just one example, and many other examples and configurations of communication device are possible.

Figure 13:
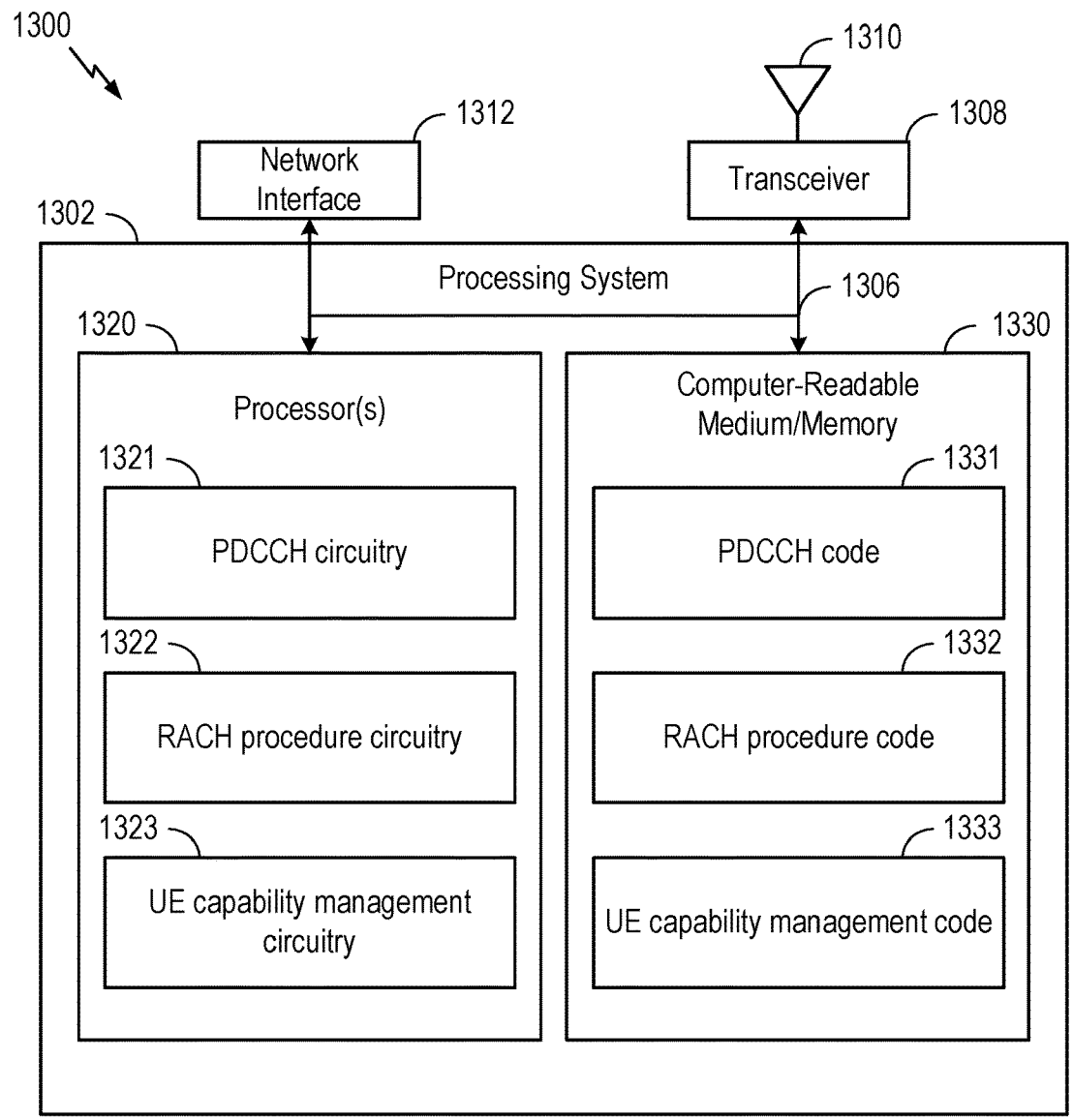
FIG. 13 shows examples of a communications device according to aspects of the present disclosure.

FIG. 13 depicts an example communications device 1300 that includes various components operable, configured, or adapted to perform operations for the techniques disclosed herein, such as the operations depicted and described with respect to FIG. 13. In some examples, communication device may be a BS 102 as described, for example with respect to FIG. 1 and FIG. 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

A transceiver 1308 may communicate bi-directionally, via antennas 1310, wired, or wireless links as described above. For example, the transceiver 1308 may represent a wireless transceiver 1308 and may communicate bi-directionally with another wireless transceiver 1308. The transceiver 1308 may also include or be connected to a modem to modulate the packets and provide the modulated packets to for transmission, and to demodulate received packets. In some examples, transceiver 1308 may be tuned to operate at specified frequencies. For example, a modem can configure the transceiver 1308 to operate at a specified frequency and power level based on the communication protocol used by the modem.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 13, or other operations for performing the various techniques discussed herein.

Various components of communications device 1300 may provide means for performing the methods described herein, including with respect to FIG. 13.

In some examples, means for transmitting or sending (or means for outputting for transmission) may include the transceivers 232 and/or antenna 1260(s) 234 of the BS 102 illustrated in FIG. 2 and/or transceiver 1308 and antenna 1310 of the communication device in FIG. 13.

In some examples, means for receiving (or means for obtaining) may include the transceivers 232 and/or antenna(s) 234 of the base station illustrated in FIG. 2 and/or transceiver 1308 and antenna 1310 of the communication device in FIG. 13.

In some examples, means for participating may include various processing system 1302 components, such as: the one or more processors 1320 in FIG. 13, or aspects of the BS 102 depicted in FIG. 2, including receive processor 238, transmit processor 220, TX MIMO processor 230, and/or controller/processor 240.

In some examples, one or more processors 1320 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1320 are configured to operate a memory array using a memory controller. In other cases, a memory controller is integrated into the one or more processors 1320. In some cases, the one or more processors 1320 are configured to execute computer-readable instructions stored in a memory to perform various functions. In some aspects, one or more processors 1320 include special purpose components for modem processing, baseband processing, digital signal processing, or transmission processing.

In one aspect, one or more processors 1320 include PDCCH circuitry 1321, RACH procedure circuitry 1322, and UE capability management circuitry 1323.

According to some aspects, PDCCH circuitry 1321 transmits, to at least one UE, a PDCCH that orders the UE to perform a type of RACH procedure using at least one of a CE or a power control scheme in a manner determined by indicated capabilities of the UE. In some examples, the PDCCH indicates whether the RACH procedure includes a first type of RACH procedure in which the UE transmits a first type of RACH message that includes a PRACH preamble or a second type of RACH procedure in which the UE transmits a second type of RACH message that includes a composite PRACH preamble and PUSCH; and where the first type of RACH message or the second type of RACH message can be transmitted on a regular (e.g., normal) or a supplementary uplink carrier signaled by the PDCCH. In some examples, the PDCCH indicates whether the RACH procedure includes the first type of RACH procedure or second type of RACH procedure via bits at least in a FDRA field of DCI conveyed by the PDCCH, a DMRS configuration of the PDCCH, an index of a PRACH preamble or preamble group, or an index of a PRACH mask.

In some examples, PDCCH circuitry 1321 schedules the UE, via the PDCCH, to perform the RACH procedure such that a time between a last symbol of the PDCCH and a first symbol of the first type of RACH message or the second type of RACH message is equal to or greater than the minimum gap. In some examples, the at least one UE includes a group of UEs; and the PDCCH includes a groupcast PDCCH transmitted in a CSS set and a payload or CRC bits of the payload is scrambled by a group RNTI. In some examples, the CE includes at least one of repetition for PRACH, a repetition for PUSCH, frequency hopping for PRACH, frequency hopping for PUSCH, or DMRS bundling for PUSCH.

In some examples, the PDCCH indicates whether the RACH procedure includes a first type of RACH procedure in which the UE transmits a first type of RACH message that includes a PRACH preamble or a second type of RACH procedure in which the UE transmits a second type of RACH message that includes a composite PRACH preamble and PUSCH, and where the PDCCH indicates at least one of one or more power control parameters for the first type of RACH message or the second type of RACH message, or one or more CE schemes for the first type of RACH message or the second type of RACH message, or a set of modulation, coding and HARQ processing parameters for msgA PUSCH. In some examples, the power control parameters depend on at least one of the type of RACH procedure, a QCI or TCI state, a CSI report, a power control scheme, or a contention resolution scheme for the RACH procedure type. In some examples, the power control parameters include at least one of: an indicator of uplink full power transmission parameter, a QCL or TCI, a TPC command, a transmit power ramp-up parameter, or a transmit power offset between PRACH and PUSCH.

According to some aspects, RACH procedure circuitry 1322 participates in the type of RACH procedure with the UE in accordance with the PDCCH and the indicated capabilities of the UE. In some examples, the indicated capabilities of the UE include at least one of: a capability of the UE to support the second type of RACH procedure, a capability of the UE to support CE, a capability of the UE to support HD FDD, a RF retuning capability of the UE, or a capability of the UE for processing PDCCH, PUSCH, or PUSCH transmissions. In some examples, UE capability management circuitry 1323 determines a minimum gap based, at least in part, on the indicated capabilities of the UE. In some examples, the minimum gap is determined based on at least one of the type of RACH procedure, a CE capability of the UE, a UE processing capability for PDCCH, PRACH or PUSCH, or a minimum SCS configuration for the PDCCH, the PRACH or the PUSCH. In some examples, the minimum gap is determined based on at least one of a BWP switching delay that depends on UE capability or an HD FDD switching delay that depends on UE capability. In some examples, the minimum gap is determined based on at least one of an uplink switching gap that depends on UE capability and an uplink transmission switching option or a delay extension that depends on UE capability, an operating FR, a QCL or TCI state, and a SSB or downlink reference signal configuration of a serving cell.

In one aspect, computer-readable medium/memory 1330 includes (e.g., stores) PDCCH code 1331, RACH procedure code 1332, and UE capability management code 1333.

Examples of computer-readable medium/memory 1330 include random access memory (RAM), read-only memory (ROM), or a hard disk. Examples of memory devices include solid state memory and a hard disk drive. In some examples, computer-readable medium/memory 1330 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Notably, FIG. 13 is just use example, and many other examples and configurations of communication device are possible.

Example Clauses

Implementation examples are described in the following numbered clauses:

Clause 1: A method for wireless communications by a UE, comprising: transmitting an indication of one or more capabilities of the UE to a network entity; transmitting a report of channel state information to the network entity; receiving a PDCCH that orders the UE to perform a type of RACH procedure on an uplink carrier using at least one of CE or an uplink power control scheme of the type of RACH procedure in a manner determined by the indicated capabilities of the UE; and performing the type of RACH procedure on the uplink carrier using the CE or uplink power control scheme of the type of RACH procedure in accordance with the PDCCH.

Clause 2: The method of Clause 1, wherein: the PDCCH indicates whether the RACH procedure comprises a first type of RACH procedure in which the UE transmits a first type of RACH message that includes a PRACH preamble; or a second type of RACH procedure in which the UE transmits a second type of RACH message that comprises a composite a PRACH preamble and a PUSCH; and wherein the first type of RACH message or the second type of RACH message can be transmitted on a regular or a supplementary uplink carrier signaled by the PDCCH.

Clause 3: The method of any one of Clauses 1 and 2, wherein: the at least one CE comprises at least one of repetition for PRACH, a repetition for PUSCH, frequency hopping for PRACH, frequency hopping for PUSCH, or DMRS bundling for PUSCH.

Clause 4: The method of Clause 2, wherein: the PDCCH indicates whether the RACH procedure comprises the first type of RACH procedure or second type of RACH procedure via bits at least in a FDRA field, a DMRS configuration of the PDCCH, an index of a PRACH preamble or preamble group, or an index of a PRACH mask.

Clause 5: The method of Clause 2, wherein: the PDCCH indicates whether the RACH procedure comprises the first type of RACH procedure or second type of RACH procedure via bits at least in a FDRA field, a DMRS configuration of the PDCCH, an index of a PRACH preamble or preamble group, or an index of a PRACH mask.

Clause 6: The method of Clause 5, further comprising: determining a minimum gap based, at least in part, on the indicated capabilities of the UE; and performing the RACH procedure only if a time between a last symbol of the PDCCH and a first symbol of the first type of RACH message or second type of RACH message is equal to or greater than the minimum gap.

Clause 7: The method of Clause 6, wherein: the minimum gap is determined based on at least one of the type of RACH procedure, a CE capability of the UE, a UE processing capability for PDCCH, PRACH or PUSCH, and a minimum SCS configuration for the PDCCH, the PRACH or the PUSCH.

Clause 8: The method of Clause 6, wherein: the minimum gap is determined based on at least one of a BWP switching delay that depends on UE capability; or an HD FDD switching delay that depends on UE capability.

Clause 9: The method of Clause 6, wherein: the minimum gap is determined based on at least one of an uplink switching gap that depends on UE capability and an uplink transmission switching option; or a delay extension that depends on UE capability, an operating FR, a QCL or TCI state, and a SSB or downlink reference signal configuration of a serving cell.

Clause 10: The method of any one of Clauses 1-9, wherein: the PDCCH indicates: whether the RACH procedure comprises a first type of RACH procedure in which the UE transmits a first type of RACH message that includes a PRACH preamble or a second type of RACH procedure in which the UE transmits a second type of RACH message that comprises a composite PRACH preamble and PUSCH; and at least one of one or more power control parameters for first or second type of RACH message, or one or more CE schemes for the first type of RACH message or second type of RACH message, and a set of modulation, coding and HARQ processing parameters for the PUSCH of the second type of RACH message.

Clause 11: The method of Clause 10, wherein: the power control parameters depend on at least one of the type of RACH procedure, a power control scheme, a TCI or QCL state, or a contention resolution scheme for the RACH procedure type.

Clause 12: The method of Clause 11, wherein: the power control parameters comprise at least one of: an indicator of uplink full power transmission parameter, a TCI or QCL state, TPC command, a transmit power ramp-up parameter, or a transmit power offset between PRACH and PUSCH.

Clause 13: The method of any one of Clauses 1-12, wherein: the PDCCH comprises a groupcast PDCCH transmitted in a CSS set; and a payload or CRC bits of the payload is scrambled by a group RNTI.

Clause 14: A method for wireless communications by a network entity, comprising: transmitting, to at least one UE, a PDCCH that orders the UE to perform a type of RACH procedure using at least one of a CE or a power control scheme in a manner determined by indicated capabilities of the UE; and participating in the type of RACH procedure with the UE in accordance with the PDCCH and the indicated capabilities of the UE.

Clause 15: The method of Clause 14, wherein: the PDCCH indicates whether the RACH procedure comprises: a first type of RACH procedure in which the UE transmits a first type of RACH message that includes a PRACH preamble; or a second type of RACH procedure in which the UE transmits a second type of RACH message that comprises a composite PRACH preamble and PUSCH; and wherein the first type of RACH message or the second type of RACH message can be transmitted on a regular or a supplementary uplink carrier signaled by the PDCCH.

Clause 16: The method of Clause 14, wherein: wherein the CE comprises at least one of repetition for PRACH, a repetition for PUSCH, frequency hopping for PRACH, frequency hopping for PUSCH, or DMRS bundling for PUSCH.

Clause 17: The method of Clause 15, wherein: the PDCCH indicates whether the RACH procedure comprises the first type of RACH procedure or second type of RACH procedure via bits at least in a FDRA field of DCI conveyed by the PDCCH, a DMRS configuration of the PDCCH, an index of a PRACH preamble or preamble group, or an index of a PRACH mask.

Clause 18: The method of Clause 15, wherein: the indicated capabilities of the UE comprise at least one of: a capability of the UE to support the second type of RACH procedure, a capability of the UE to support CE, a capability of the UE to support HD FDD, a RF retuning capability of the UE, or a capability of the UE for processing PDCCH, PUSCH, or PUSCH transmissions.

Clause 19: The method of Clause 15, further comprising: determining a minimum gap based, at least in part, on the indicated capabilities of the UE; and scheduling the UE, via the PDCCH, to perform the RACH procedure such that a time between a last symbol of the PDCCH and a first symbol of the first type of RACH message or the second type of RACH message is equal to or greater than the minimum gap.

Clause 20: The method of Clause 19, wherein: the minimum gap is determined based on at least one of the type of RACH procedure, a CE capability of the UE, a UE processing capability for PDCCH, PRACH or PUSCH, or a minimum SCS configuration for the PDCCH, the PRACH or the PUSCH.

Clause 21: The method of Clause 19, wherein: the minimum gap is determined based on at least one of: a BWP switching delay that depends on UE capability; or an HD FDD switching delay that depends on UE capability.

Clause 22: The method of Clause 19, wherein: the minimum gap is determined based on at least one of: an uplink switching gap that depends on UE capability and an uplink transmission switching option; or a delay extension that depends on UE capability, an operating FR, a QCL or TCI state, and a SSB or downlink reference signal configuration of a serving cell.

Clause 23: The method of any one of Clauses 14-22, wherein: the PDCCH indicates: whether the RACH procedure comprises a first type of RACH procedure in which the UE transmits a first type of RACH message that includes a PRACH preamble or a second type of RACH procedure in which the UE transmits a second type of RACH message that comprises a composite PRACH preamble and PUSCH; and at least one of one or more power control parameters for the first type of RACH message or the second type of RACH message, or one or more CE schemes for the first type of RACH message or the second type of RACH message, or a set of modulation, coding and HARQ processing parameters for msgA PUSCH.

Clause 24: The method of Clause 23, wherein: the power control parameters depend on at least one of the type of RACH procedure, a QCI or TCI state, a CSI report, a power control scheme, or a contention resolution scheme for the RACH procedure type.

Clause 25: The method of Clause 24, wherein: the power control parameters comprise at least one of: an indicator of uplink full power transmission parameter, a QCL or TCI, a TPC command, a transmit power ramp-up parameter, or a transmit power offset between PRACH and PUSCH.

Clause 26: The method of Clause 15, wherein: the at least one UE comprises a group of UEs; and the PDCCH comprises a groupcast PDCCH transmitted in a CSS set; and a payload or CRC bits of the payload is scrambled by a group RNTI.

Clause 27: A method for wireless communications by a user equipment (UE), comprising: transmitting an indication of one or more capabilities of the UE; receiving a physical downlink control channel (PDCCH) that orders the UE to perform a random access channel (RACH) procedure on an uplink carrier based on the one or more capabilities of the UE; determining a minimum gap between a last symbol of the PDCCH and a first symbol of a RACH message, wherein the minimum gap includes a half-duplex (HD) switching delay; and performing the RACH procedure on the uplink carrier when a gap between the last symbol of the PDCCH and the first symbol of the RACH message is equal to or larger than the minimum gap.

Clause 28: The method of Clause 27, wherein a type of the RACH procedure comprises: a first type of RACH procedure in which the UE transmits a first type of RACH message that includes a physical RACH (PRACH) preamble; or a second type of RACH procedure in which the UE transmits a second type of RACH message that includes a composite of the PRACH preamble and a physical uplink shared channel (PUSCH).

Clause 29: The method of Clause 28, wherein the PDCCH indicates the uplink carrier, and wherein the uplink carrier is a normal uplink carrier or a supplementary uplink (SUL) carrier within an uplink bandwidth part (BWP) smaller than or equal to a maximum uplink BWP capability of the UE.

Clause 30: The method of any one or more of Clauses 28-29, wherein: the RACH procedure is performed with coverage enhancement (CE) based on the one or more capabilities of the UE; and the CE comprises at least one of: repetition of the PRACH preamble, repetition of the PUSCH, frequency hopping for the PRACH preamble, frequency hopping for the PUSCH, or demodulation reference signal (DMRS) bundling for the PUSCH.

Clause 31: The method of any one or more of Clauses 28-30, wherein the PDCCH indicates the type of the RACH procedure and a synchronization signal block (SSB) index, wherein an uplink bandwidth part (BWP) for the RACH procedure is associated with a downlink BWP containing the SSB, and wherein the SSB comprises a cell-defining SSB (CD-SSB) or a non-cell-defining SSB (NCD-SSB).

Clause 32. The method of Clause 31, wherein the PDCCH indicates the type of the RACH procedure via bits in at least one of: a frequency domain resource allocation (FDRA) field, a DMRS configuration of the PDCCH, an index of the PRACH preamble, an index of a PRACH preamble group, or an index of a PRACH mask.

Clause 33: The method of any one or more of Clauses 27-32, wherein determining the minimum gap is based on at least one of: a UE processing capability for reference signal received power (RSRP) measurement, PDCCH, a physical RACH (PRACH), or a physical uplink shared channel (PUSCH); a minimum subcarrier spacing (SC S) configuration of the PDCCH, the PRACH, or the PUSCH; a bandwidth part (BWP) switching delay; a delay extension based on an operating frequency range (FR); or a switching gap between downlink reception and uplink transmission.

Clause 34: The method of Clause 33, wherein: the BWP switching delay depends on a capability of the UE; and the switching gap depends on a capability of the UE.

Clause 35: The method of any one or more of Clauses 27-34, wherein determining the minimum gap is based on at least one of: an uplink switching gap that depends on a capability of the UE; an uplink transmission switching option; a quasi co-location (QCL); a transmission configuration indicator (TCI) state; a synchronization signal block (SSB); or a downlink reference signal configuration of a serving cell.

Clause 36: The method of any one or more of Clauses 27-35, wherein the indication of the one or more capabilities of the UE comprises an indication of at least one of: the UE is a reduced capability (RedCap) UE or a capability of the UE to support half duplex (HD).

Clause 37: The method of any one or more of Clauses 27-36, wherein the one or more capabilities of the UE comprise at least one of: a capability of the UE to support a type of RACH procedure; a capability of the UE to support coverage enhancement (CE); a capability of the UE to support half duplex (HD) frequency division duplexing (FDD); a radio frequency (RF) retuning capability of the UE; or a capability of the UE for processing the PDCCH, a physical RACH (PRACH), or a physical uplink shared channel (PUSCH).

Clause 38: The method of any one or more of Clauses 27-37, wherein determining the minimum gap is based on at least one of: a type of RACH procedure or a coverage enhancement (CE) of the RACH procedure.

Clause 39: The method of any one or more of Clauses 27-38, wherein the PDCCH indicates a set of modulation, coding and hybrid automatic repeat request (HARD) processing parameters for a physical uplink shared channel (PUSCH) RACH message.

Clause 40: The method of any one or more of Clauses 27-39, wherein the PDCCH indicates one or more power control parameters for a physical RACH (PRACH) message based on the one or more capabilities of the UE.

Clause 41: The method of Clause 40, wherein the one or more power control parameters depend on at least one of: a type of the RACH procedure, a power control scheme, a transmission configuration indicator (TCI) state, a quasi co-location (QCL) state, or a contention resolution scheme for the RACH procedure.

Clause 42: The method of Clause 41, wherein the one or more power control parameters comprise at least one of: an indicator of an uplink full power transmission parameter, a TCI state, a QCL state, a transmission power control (TPC) command, a transmit power ramp-up parameter, or a transmit power offset between a physical RACH (PRACH) and physical uplink shared channel (PUSCH) transmission.

Clause 43: The method of any one or more of Clauses 27-42, wherein: the PDCCH comprises a groupcast PDCCH transmitted in a common search space (CSS) set; and a payload or cyclic redundancy check (CRC) bits of the payload is scrambled by a group radio network temporary identifier (RNTI).

Clause 44: The method of any one or more of Clauses 27-43, further comprising: sending a channel state information (CSI) report; and receiving a coverage enhancement (CE) configuration for the RACH procedure based on the CSI report.

Clause 45: The method of any one or more of Clauses 27-44, wherein the half-duplex (HD) switching delay comprises a first delay for the UE to switch from uplink transmission to downlink reception or a second delay for the UE to switch from downlink reception to uplink transmission.

Clause 46: A method for wireless communications by a network entity, comprising: outputting for transmission, to at least one user equipment (UE), a physical downlink control channel (PDCCH) that orders the at least one UE to perform a random access channel (RACH) procedure based on one or more capabilities of the at least one UE; and obtaining a RACH message from the at least one UE after a minimum gap between a last symbol of the PDCCH and a first symbol of the RACH message, wherein the minimum gap includes a half-duplex (HD) switching delay.

Clause 47: The method of Clause 46, wherein a type of the RACH procedure comprises: a first type of RACH procedure in which the UE transmits a first type of RACH message that includes a physical RACH (PRACH) preamble; or a second type of RACH procedure in which the UE transmits a second type of RACH message that includes a composite PRACH preamble and a physical uplink shared channel (PUSCH).

Clause 48: The method of Clause 47, wherein: the RACH procedure is performed with coverage enhancement (CE); and the CE comprises at least one of: repetition for PRACH preamble, repetition of the PUSCH, frequency hopping for PRACH preamble, frequency hopping for the PUSCH, or demodulation reference signal (DMRS) bundling for the PUSCH.

Clause 49. The method of any one or more of Clauses 47-48, further comprising: obtaining an indication from the at least one UE of the one or more capabilities of the at least one UE, wherein the indication of one or more capabilities comprises at least one of: an indication the at least one UE is a reduced capability (RedCap) UE or a capability of the at least one UE to support half duplex (HD).

Clause 49. The method of any one or more of Clauses 47-49, further comprising: determining the minimum gap based, at least in part, on the one or more capabilities of the at least one UE; and scheduling the at least one UE, via the PDCCH, to perform the RACH procedure such that a time between the last symbol of the PDCCH and the first symbol of the RACH message is equal to or greater than the minimum gap.

Clause 49. The method of any one or more of Clauses 46-49, wherein the minimum gap is based on at least one of: a UE processing capability for reference signal received power (RSRP) measurement, the PDCCH, a physical RACH (PRACH), or a physical uplink shared channel (PUSCH); a minimum subcarrier spacing (SCS) configuration for the PDCCH, the PRACH, or the PUSCH; a bandwidth part (BWP) switching delay; a delay extension based on an operating frequency range (FR); or a switching gap between downlink reception and uplink transmission.

Clause 50. The method of any one or more of Clauses 46-49, wherein the PDCCH indicates one or more power control parameters for a physical RACH (PRACH) message based on the one or more capabilities of the apparatus.

Clause 51. The method of any one or more of Clauses 46-50, wherein the half-duplex (HD) switching delay comprises a first delay for the UE to switch from uplink transmission to downlink reception or a second delay for the at least one UE to switch from downlink reception to uplink transmission.

Clause 52. The method of any one or more of Clauses 46-51, wherein: the at least one UE comprises a group of UEs; the PDCCH comprises a groupcast PDCCH transmitted in a common search space (CSS) set; and a payload of the PDCCH or cyclic redundancy check (CRC) bits of the payload of the PDCCH is scrambled by a group radio network temporary identifier (RNTI).

Clause 53: A processing system, comprising: a memory comprising computer-executable instructions; one or more processors configured to execute the computer-executable instructions and cause the processing system to perform a method in accordance with any one of Clauses 1-52.

Clause 54: A processing system, comprising means for performing a method in accordance with any one of Clauses 1-52.

Clause 55: A non-transitory computer-readable medium comprising computer-executable instructions that, when executed by one or more processors of a processing system, cause the processing system to perform a method in accordance with any one of Clauses 1-52.

Clause 56: A computer program product embodied on a computer-readable storage medium comprising code for performing a method in accordance with any one of Clauses 1-52.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as eMBB, mmWave, MTC, and/or mission critical targeting URLLC. These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, gNB, AP, distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as gNB 180 may operate in a traditional sub-6 GHz spectrum, in mmWave frequencies, and/or near mmWave frequencies in communication with the UE 104. When the BS 180 operates in mmWave or near mmWave frequencies, the BS 180 may be referred to as a mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi AP 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user IP packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the PDSCH, in some examples.

A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a PSSCH.

Processor 220 may process (e.g., encode and symbol map) the data and control information to obtain data symbols and control symbols, respectively. Transmit processor 220 may also generate reference symbols, such as for the primary synchronization signal (PSS), SSS, PBCH demodulation reference signal (DMRS), and CSI-RS.

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using TDD. OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be FDD, in which for a particular set of subcarriers (carrier system bandwidth), subframes within the set of subcarriers are dedicated for either DL or UL. 5G frame structures may also be TDD, in which for a particular set of subcarriers (carrier system bandwidth), subframes within the set of subcarriers are dedicated for both DL and UL. In the examples provided by FIG. 3A and FIG. 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through RRC signaling through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^μ×15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a RB (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIG. 1 and FIG. 2). The RS may include DMRS (indicated as Rx for one particular configuration, where 100x is the port number, but other DMRS configurations are possible) and CSI-RS for channel estimation at the UE. The RS may also include beam measurement RS (BRS), beam refinement RS (BRRS), and phase tracking RS (PT-RS).

FIG. 3B illustrates an example of various DL channels within a subframe of a frame. The PDCCH carries DCI within one or more control channel elements (CCEs), each CCE including nine RE groups (REGs), each REG including four consecutive REs in an OFDM symbol.

A PSS may be within symbol 2 of particular subframes of a frame. The PSS is used by a UE (e.g., 104 of FIG. 1 and FIG. 2) to determine subframe/symbol timing and a physical layer identity.

A SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The PBCH, which carries a master information block (MIB), may be logically grouped with the PSS and SSS to form a synchronization signal (SS)/PBCH block. The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 3C, some of the REs carry DMRS (indicated as R for one particular configuration, but other DMRS configurations are possible) for channel estimation at the BS. The UE may transmit DMRS for the PUCCH and DM-RS for the PUSCH. The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a BS for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

FIG. 4 depicts an example disaggregated base station architecture 400. The disaggregated base station architecture 400 may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (MC) 425 via an E2 link, or a Non-Real Time (Non-RT) RIC 415 associated with a Service Management and Orchestration (SMO) Framework 405, or both). A CU 410 may communicate with one or more DUs 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, e.g., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 410 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (e.g., Central Unit—User Plane (CU-UP)), control plane functionality (e.g., Central Unit—Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a MAC layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, PRACH extraction and filtering, or the like), or both, based at least in part on the functional split, such as a lower layer functional split. In such an architecture, the RU(s) 440 can be implemented to handle over the air (OTA) communications with one or more UEs 104. In some implementations, real-time and non-real-time aspects of control and user plane communications with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT MC 415 or the Near-RT MC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via 01) or via creation of RAN management policies (such as A1 policies).

Additional Considerations

The preceding description provides examples of PDCCH ordered RACH procedures for reduced capability UEs. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
one or more memories comprising computer-executable instructions; and
one or more processors configured to execute the computer-executable instructions and cause the user equipment to:
transmit an indication of one or more capabilities of the user equipment;
receive a physical downlink control channel (PDCCH) that orders the user equipment to perform a random access channel (RACH) procedure on an uplink carrier based on the one or more capabilities of the user equipment; and
perform the RACH procedure on the uplink carrier when a gap between a last symbol of the PDCCH and a first symbol of a RACH message is equal to or larger than a minimum gap that is based on a half-duplex switching delay.

2. The user equipment of claim 1, the one or more processors further cause the user equipment to determine the minimum gap prior to performing the RACH procedure, wherein the minimum gap includes the half-duplex switching delay.

3. The user equipment of claim 1, wherein the minimum gap is based on at least one of:
a UE processing capability for reference signal received power (RSRP) measurement, the PDCCH, a physical RACH (PRACH), or a physical uplink shared channel (PUSCH);
a minimum subcarrier spacing (SCS) configuration of the PDCCH, the PRACH, or the PUSCH;
a bandwidth part (BWP) switching delay;
a delay extension based on an operating frequency range (FR);
a switching gap between downlink reception and uplink transmission; or a combination thereof.

4. The user equipment of claim 3, wherein the minimum gap is based on the UE processing capability for RSRP measurement, the PDCCH, the PRACH, or the PUSCH.

5. The user equipment of claim 3, wherein the minimum gap is based on the minimum SCS configuration of the PDCCH, the PRACH, or the PUSCH.

6. The user equipment of claim 3, wherein the minimum gap is based on the BWP switching delay.

7. The user equipment of claim 3, wherein the minimum gap is based on the delay extension based on the operating FR.

8. The user equipment of claim 3, wherein the minimum gap is based on the switching gap between downlink reception and uplink transmission.

9. The user equipment of claim 3, wherein:
the BWP switching delay depends on the one or more capabilities of the user equipment; and
the switching gap depends on the one or more capabilities of the user equipment.

10. The user equipment of claim 1, wherein the PDCCH indicates the uplink carrier, and wherein the uplink carrier is a normal uplink carrier or a supplementary uplink (SUL) carrier within an uplink bandwidth part (BWP) smaller than or equal to a maximum uplink BWP capability of the user equipment.

11. The user equipment of claim 1, wherein a type of the RACH procedure comprises:
a first type of RACH procedure in which the user equipment transmits a first type of RACH message that includes a physical RACH (PRACH) preamble; or
a second type of RACH procedure in which the user equipment transmits a second type of RACH message that includes a composite of the PRACH preamble and a physical uplink shared channel (PUSCH).

12. The user equipment of claim 11, wherein:
the RACH procedure is performed with coverage enhancement (CE) based on the one or more capabilities of the user equipment; and
the CE comprises at least one of:
repetition of the PRACH preamble;
repetition of the PUSCH;
frequency hopping for the PRACH preamble;
frequency hopping for the PUSCH; or
demodulation reference signal (DMRS) bundling for the PUSCH.

13. The user equipment of claim 11, wherein the PDCCH indicates the type of the RACH procedure and a synchronization signal block (SSB) index, wherein an uplink bandwidth part (BWP) for the RACH procedure is associated with a downlink BWP containing the SSB, and wherein the SSB comprises a cell-defining SSB (CD-SSB) or a non-cell-defining SSB (NCD-SSB).

14. The user equipment of claim 12, wherein the PDCCH indicates the type of the RACH procedure via bits in at least one of:
a frequency domain resource allocation (FDRA) field, a DMRS configuration of the PDCCH;
an index of the PRACH preamble;
an index of a PRACH preamble group; or
an index of a PRACH mask.

15. The user equipment of claim 1, wherein the minimum gap is based on at least one of:
an uplink switching gap that depends on the one or more capabilities of the user equipment;
an uplink transmission switching option;
a quasi co-location (QCL);
a transmission configuration indicator (TCI) state;
a synchronization signal block (SSB); or
a downlink reference signal configuration of a serving cell.

16. The user equipment of claim 1, wherein the indication of the one or more capabilities of the user equipment comprises at least one of: an indication that the user equipment is a reduced capability (RedCap) user equipment; or an indication of a capability of the user equipment to support half-duplex.

17. The user equipment of claim 1, wherein the one or more capabilities of the user equipment comprise at least one of:
a capability of the user equipment to support a type of RACH procedure;
a capability of the user equipment to support coverage enhancement (CE);

a capability of the user equipment to support half-duplex frequency division duplexing (FDD);
a radio frequency (RF) retuning capability of the user equipment; or
a capability of the user equipment for processing the PDCCH, a physical RACH (PRACH), or a physical uplink shared channel (PUSCH).

18. The user equipment of claim 1, wherein the minimum gap is based on at least one of:
a type of the RACH procedure; or
a coverage enhancement (CE) of the RACH procedure.

19. The user equipment of claim 1, wherein the PDCCH indicates one or more power control parameters for a physical RACH (PRACH) message based on the one or more capabilities of the user equipment.

20. The user equipment of claim 19, wherein the one or more power control parameters depend on at least one of:
a type of the RACH procedure;
a power control scheme;
a transmission configuration indicator (TCI) state;
a quasi co-location (QCL) state;
or a contention resolution scheme for the RACH procedure.

21. The user equipment of claim 20, wherein the one or more power control parameters comprise at least one of:
an indicator of an uplink full power transmission parameter;
a TCI state;
a QCL state;
a transmission power control (TPC) command;
a transmit power ramp-up parameter; or
a transmit power offset between a physical RACH (PRACH) and physical uplink shared channel (PUSCH) transmission.

22. The user equipment of claim 1, wherein:
the PDCCH comprises a groupcast PDCCH transmitted in a common search space (CSS) set; and
a payload or cyclic redundancy check (CRC) bits of the payload is scrambled by a group radio network temporary identifier (RNTI).

23. The user equipment of claim 1, wherein the half-duplex switching delay comprises a first delay for the user equipment to switch from uplink transmission to downlink reception or a second delay for the user equipment to switch from downlink reception to uplink transmission.

24. A method of wireless communication by a user equipment, the method comprising:
transmitting an indication of one or more capabilities of the user equipment;
receiving a physical downlink control channel (PDCCH) that orders the user equipment to perform a random access channel (RACH) procedure on an uplink carrier based on the one or more capabilities of the user equipment; and
performing the RACH procedure on the uplink carrier when a gap between a last symbol of the PDCCH and a first symbol of a RACH message is equal to or larger than a minimum gap that is based on a half-duplex switching delay.

25. The method of claim 24, further comprising determining the minimum gap prior to performing the RACH procedure, wherein the minimum gap includes the half-duplex switching delay.

26. The method of claim 24, wherein the minimum gap is based on at least one of:
a UE processing capability for reference signal received power (RSRP) measurement, the PDCCH, a physical RACH (PRACH), or a physical uplink shared channel (PUSCH);
a minimum subcarrier spacing (SCS) configuration of the PDCCH, the PRACH, or the PUSCH;
a bandwidth part (BWP) switching delay;
a delay extension based on an operating frequency range (FR);
a switching gap between downlink reception and uplink transmission; or a combination thereof.

27. The method of claim 26, wherein the minimum gap is based on the UE processing capability for RSRP measurement, the PDCCH, the PRACH, or the PUSCH.

28. The method of claim 26, wherein the minimum gap is based on the minimum SCS configuration of the PDCCH, the PRACH, or the PUSCH.

29. The method of claim 26, wherein the minimum gap is based on the BWP switching delay.

30. A network entity, comprising:
one or more memories comprising computer-executable instructions; and
one or more processors configured to execute the computer-executable instructions and cause the network entity to:
obtain an indication of one or more capabilities of a user equipment;
outputting for transmission, to the user equipment, a physical downlink control channel (PDCCH) that orders the user equipment to perform a random access channel (RACH) procedure based on one or more capabilities of the user equipment; and
obtain a RACH message from the user equipment after a minimum gap between a last symbol of the PDCCH and a first symbol of the RACH message, wherein the minimum gap is based on a half-duplex switching delay.

* * * * *